United States Patent [19]

Van Order et al.

[11] Patent Number: 5,484,186
[45] Date of Patent: Jan. 16, 1996

[54] ELECTRICAL CIRCUIT AND TRIM PANEL

[75] Inventors: Kim L. Van Order, Hamilton; Lee Garvelink; Rick A. Van Vuren, both of Holland; Jerry M. De Jong, West Olive; Alex C. Ramon, Holland, all of Mich.

[73] Assignee: Prince Corporation, Holland, Mich.

[21] Appl. No.: 190,595

[22] Filed: Feb. 2, 1994

Related U.S. Application Data

[62] Division of Ser. No. 875,644, Apr. 28, 1992, Pat. No. 5,309,634.

[51] Int. Cl.⁶ .................................................... B60R 13/02
[52] U.S. Cl. ........................... 296/97.5; 296/214; 439/34; 439/404
[58] Field of Search ................................. 296/39.1, 146.7, 296/152, 214, 97.1, 97.2, 97.5; 439/34, 36, 404, 405, 723, 724

[56] References Cited

U.S. PATENT DOCUMENTS

| | | |
|---|---|---|
| 3,154,365 | 10/1964 | Crimmins . |
| 3,300,851 | 1/1967 | Lodder . |
| 3,753,207 | 8/1973 | Maheux et al. . |
| 3,836,415 | 9/1974 | Hilderbrandt . |
| 3,911,201 | 10/1975 | Fry . |
| 4,100,372 | 7/1978 | Hypolite . |
| 4,119,794 | 10/1978 | Matsuki . |
| 4,174,864 | 11/1979 | Viertel et al. . |
| 4,210,773 | 7/1980 | Haley et al. . |
| 4,241,870 | 12/1980 | Marcus . |
| 4,377,020 | 3/1983 | Vigo . |
| 4,474,420 | 10/1984 | Nestor . |
| 4,505,054 | 3/1985 | Clark et al. . |
| 4,553,797 | 11/1985 | Marcus . |
| 4,580,322 | 4/1986 | Wright et al. . |
| 4,634,196 | 1/1987 | Nestell . |
| 4,641,903 | 2/1987 | Anhalt ..................................... 439/404 |
| 4,646,957 | 3/1987 | Nuss . |
| 4,737,764 | 4/1988 | Harrison . |
| 4,782,990 | 11/1988 | Patrikios et al. . |
| 4,783,110 | 11/1988 | Beukema et al. . |
| 4,784,615 | 11/1988 | Teng-Hong . |
| 4,794,373 | 12/1988 | Harrison . |
| 4,824,164 | 4/1989 | Nakayama et al. . |
| 4,828,910 | 5/1989 | Haussling . |
| 4,831,278 | 5/1989 | Ueda et al. . |
| 4,844,533 | 7/1989 | Dowd et al. . |
| 4,848,829 | 7/1989 | Kidd ................................... 296/39.1 X |
| 4,869,670 | 9/1989 | Ueda et al. . |
| 4,893,866 | 1/1990 | Dowd et al. . |
| 4,893,867 | 1/1990 | Hilborn et al. . |
| 4,897,042 | 1/1990 | Saka et al. ............................... 439/404 |
| 4,902,068 | 2/1990 | Dowd et al. . |
| 4,913,484 | 4/1990 | Dowd et al. . |
| 4,950,168 | 8/1990 | Watanabe et al. . |
| 4,989,911 | 2/1991 | Van Order . |
| 4,996,401 | 2/1991 | Park . |
| 5,016,934 | 5/1991 | Pelz ......................................... 296/214 |
| 5,040,990 | 8/1991 | Suman et al. . |
| 5,091,831 | 2/1992 | Van Order et al. . |
| 5,125,846 | 6/1992 | Sampson et al. .................... 439/404 X |
| 5,154,617 | 10/1992 | Suman et al. .............................. 439/34 |

FOREIGN PATENT DOCUMENTS

| | | |
|---|---|---|
| 0026283 | 6/1980 | European Pat. Off. . |
| 0341901 | 11/1989 | European Pat. Off. . |
| 1544156 | 10/1968 | France . |
| 2358269 | 3/1978 | France ..................................... 296/214 |
| 2341940 | 11/1977 | Germany . |
| 227441 | 9/1988 | Japan . |
| 2168860 | 6/1986 | United Kingdom ..................... 439/36 |

*Primary Examiner*—Dean Kramer
*Attorney, Agent, or Firm*—Price, Heneveld, Cooper, DeWitt & Litton

[57] ABSTRACT

An electrical system for vehicle panels is disclosed which includes a plurality of conductors and electrical accessories for connection to the panel. The electrical accessories include insulation displacement contacts for connection with conductors in the panel. In one embodiment, the panel includes a plurality of conductive layers providing an electrical bus for the panel. In another embodiment, the conductors are formed in the panel between two dielectric layers.

64 Claims, 14 Drawing Sheets

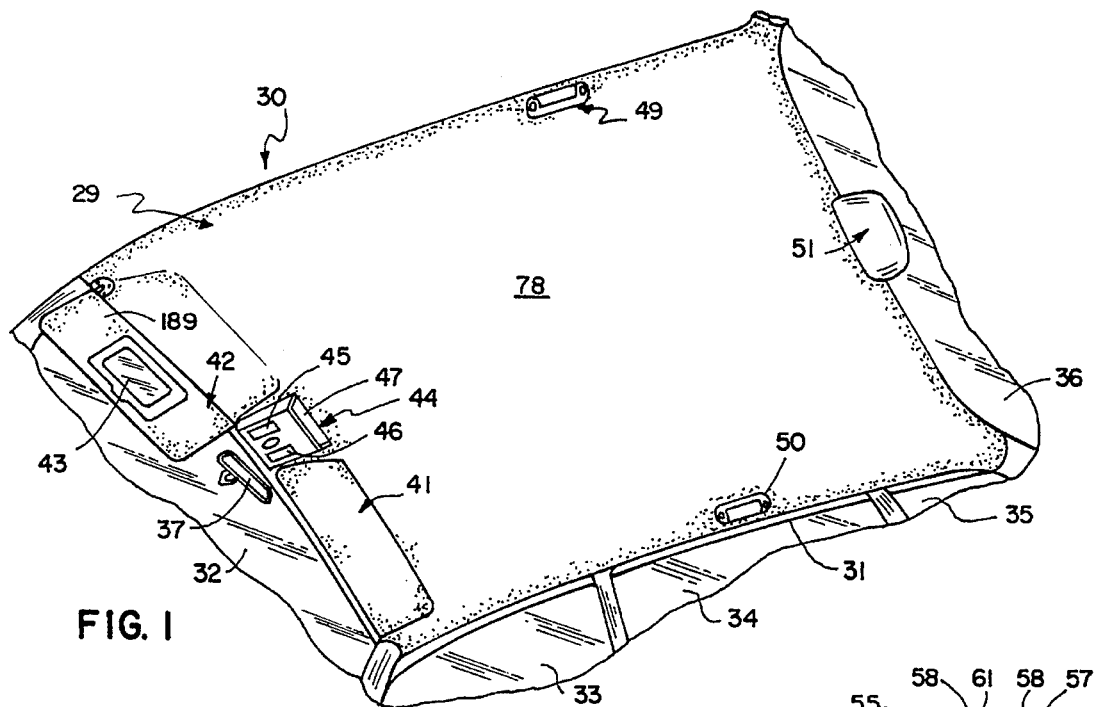
FIG. 1
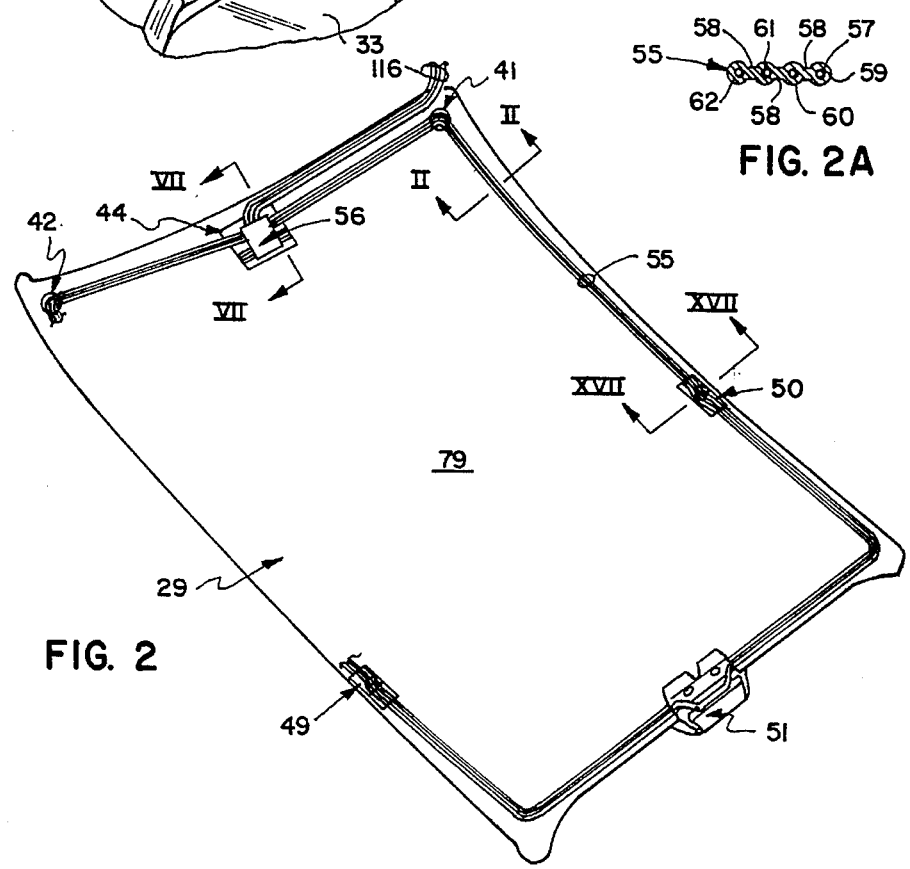
FIG. 2A
FIG. 2

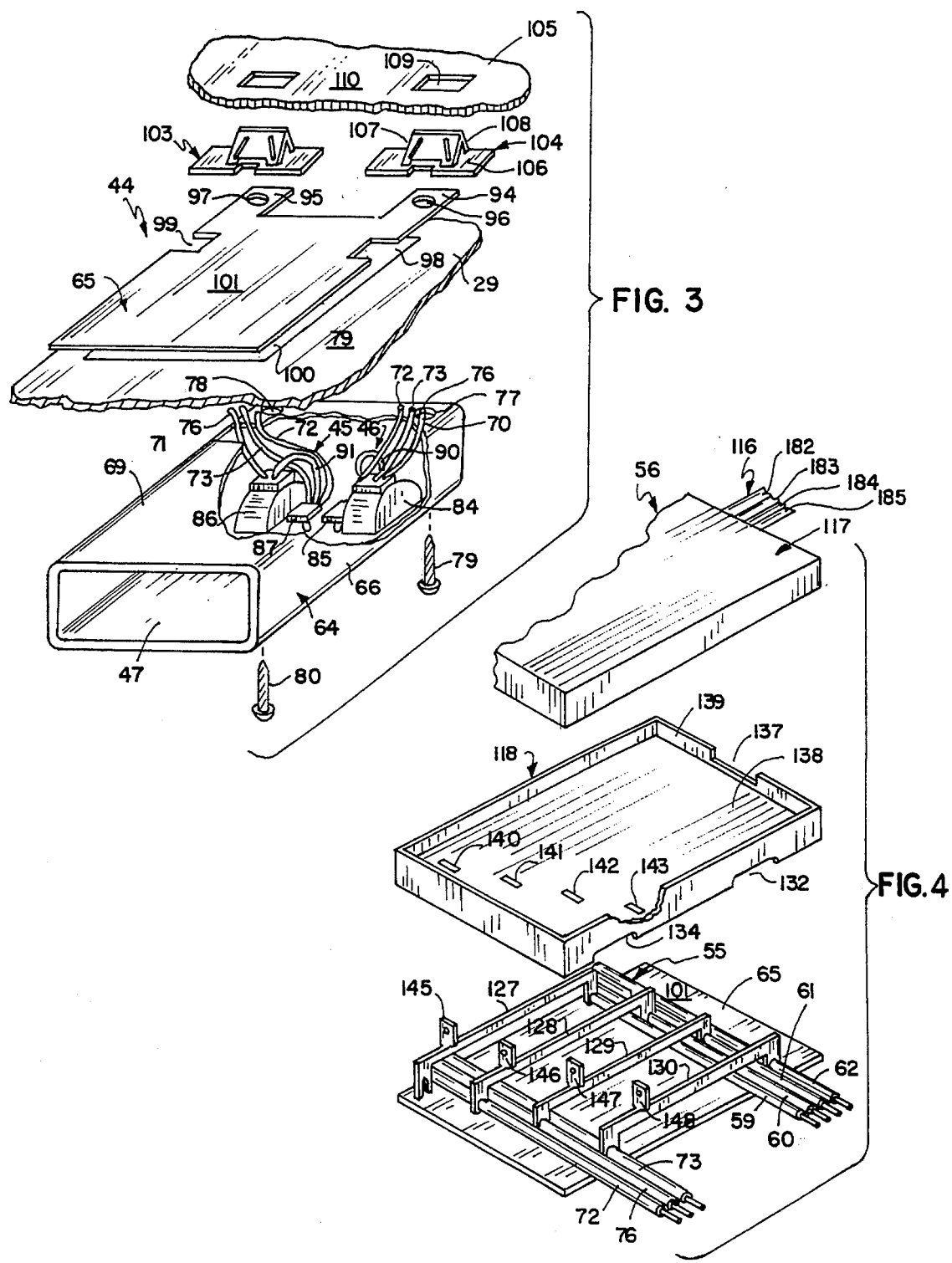

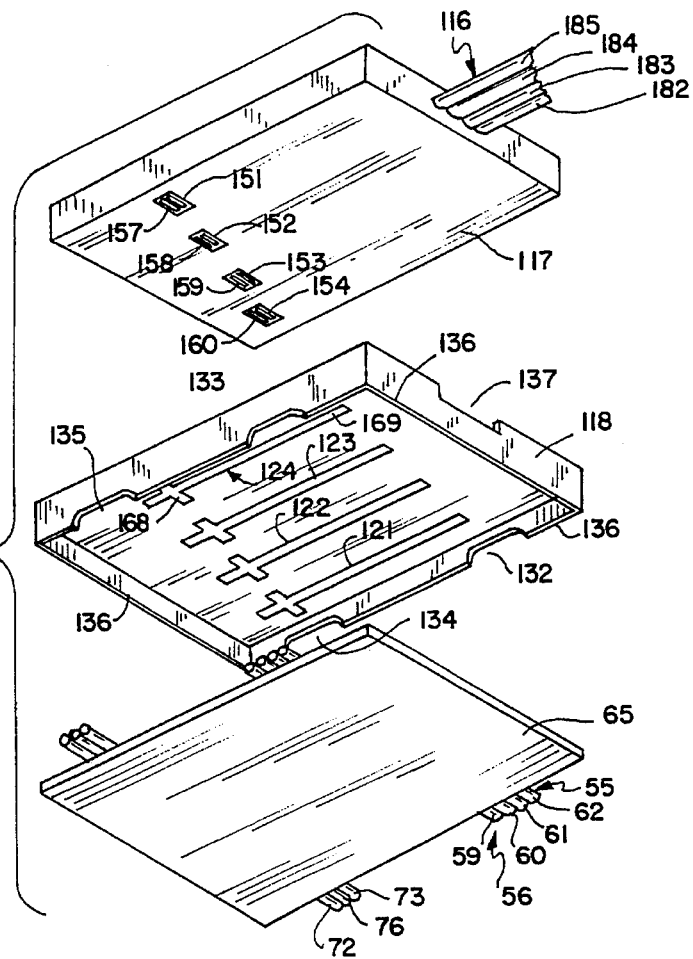
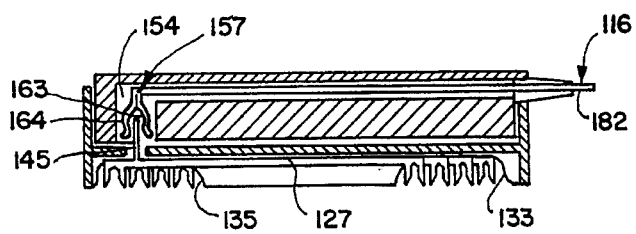
FIG. 7
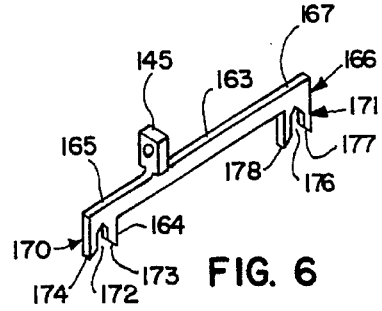
FIG. 6

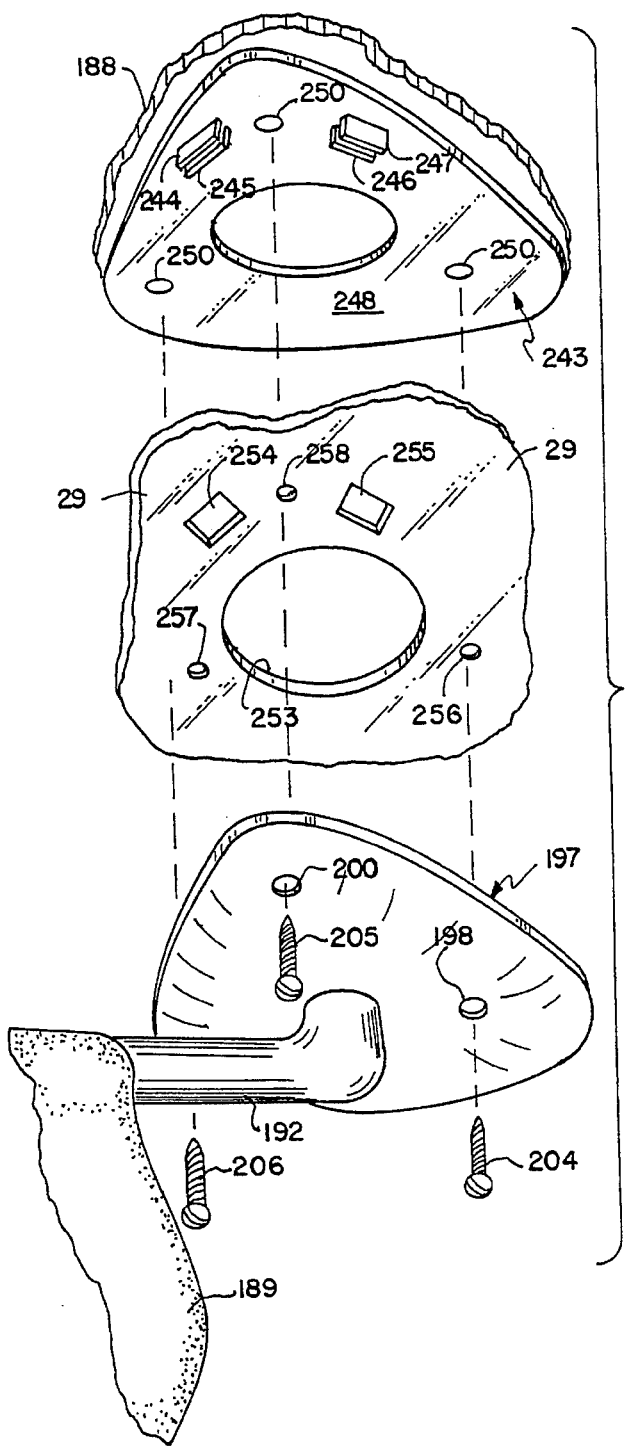
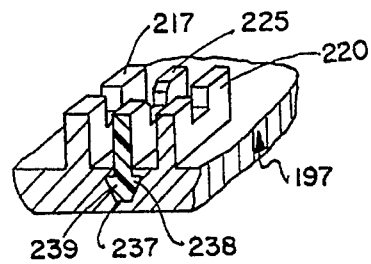
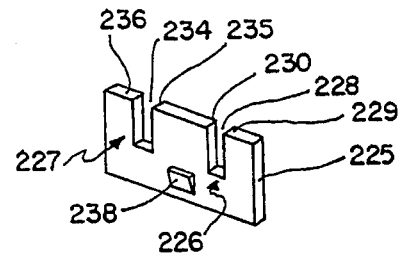
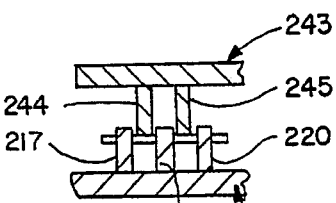
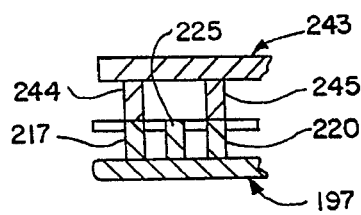

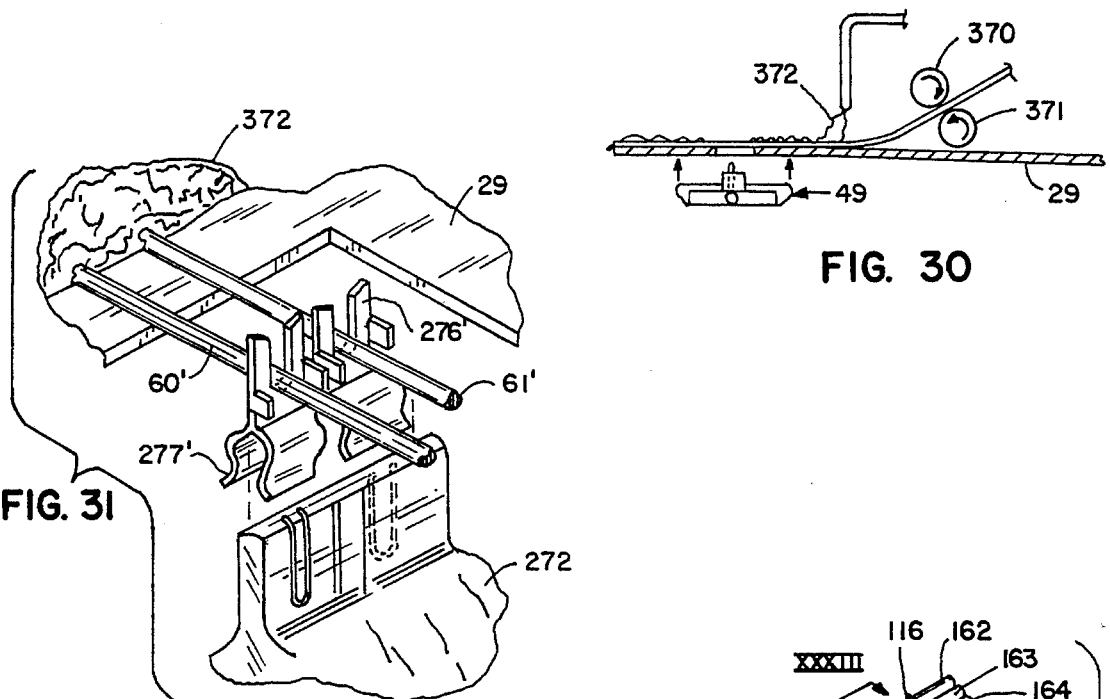
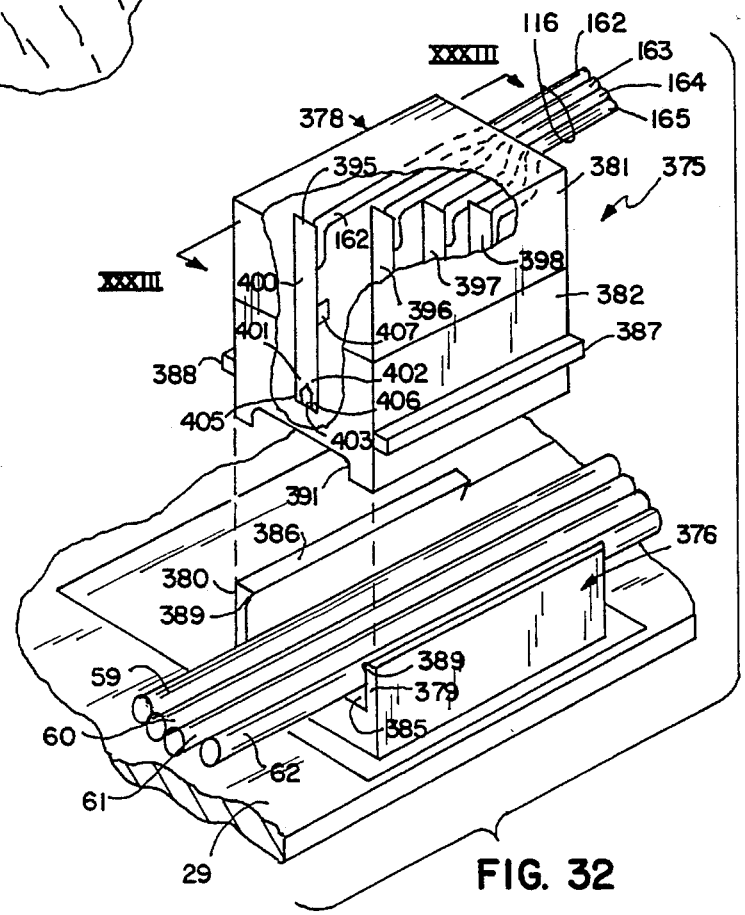

ELECTRICAL CIRCUIT AND TRIM PANEL

This is a division of application Ser. No. 07/875,644, filed Apr. 28, 1992 now U.S. Pat. No. 5,309,634.

BACKGROUND OF THE INVENTION

The present invention relates to vehicle panels and more particularly to a method and apparatus for providing an electrical circuit for vehicle panels.

Modern vehicles have interior decorative panels such as door panels and headliners which typically include a variety of electrical accessories. Examples of electrical accessories provided on door panels include speakers, lamps, and electrical switches for controlling electrically operated windows, seats, mirrors and electric door locks. Examples of accessories provided on vehicle headliners include sun visors, overhead consoles and interior lights. Overhead consoles typically include electrical accessories such as displays, electrical compasses, lamps, garage door opening transmitters, control switches and the like. Vehicle visors frequently include lamps for illuminated vanity mirrors mounted to the visors.

Such electrical accessories must be both mechanically mounted to the vehicle panels and electrically coupled to the vehicles electrical system. Once an electrical accessory is mounted on the panel, the electrical accessory is typically connected to a wire-bundle using a plug connector including conductors supported thereon. However, plug connectors and their associated conductors are expensive.

Wire-bundles are typically provided to connect the electrical accessories supported on the panels to the vehicle electrical system and may be attached to the panel using an adhesive. Conductors in the wire-bundles supply power and\or control signals from the vehicle power supply to the electrical accessories. Information signals are also transmitted between the electrical accessories and the vehicle electrical system through the conductors in the wire-bundle.

Channels are usually formed in the panels to receive wire-bundles for facilitating the mounting of the electrical system to the panel. However, such channels must be formed in the panel when it is manufactured which limits the ability to vary the location of wire-bundles to accommodate different accessory mounting locations. Thus, for example, different model vehicles may have the same roof construction and therefore headliner shape but will include different accessories attached to the headliner or other panel requiring different electrical connections.

Another method of mounting wire-bundles on a panel involves applying a hot melt glue to panel locations where conductors will be attached. The wire bundles must be attached to the molten glue before it cools and hardens. This critical timing requirement makes manual and automated installation difficult with the likelihood that many connection locations are not properly made.

After electrical accessories are preassembled to a panel, the panel system is shipped to another location for assembly in a vehicle. In the past, panels have included wire bundles connected to the panel. These bundles hang from the panel for connection with the vehicle wire-bundle. These hanging wire bundles are often used as a handle by shipping or manufacturing personnel. As a result, the panel conductor bundles may separate from the panel and become an annoying noise source for vehicle occupants if not re-attached, which frequently does not occur.

SUMMARY OF THE INVENTION

The present invention provides an electrical system for vehicle panels which manufacturing personnel can rapidly install without the likelihood of quality control difficulties and at a low cost. According to one aspect of the invention, a trim panel for a vehicle includes a conductor carried on the panel which is adapted to directly connect with the vehicle electrical system without requiring connectors. A vehicle accessory, which includes at least one insulation displacement contact, is mechanically attached to the vehicle panel while at the same time, the insulation displacement contact(s) couple the accessory to the panel conductor(s) for coupling the accessory to the vehicle's electrical system.

In one embodiment of the invention, a lamp assembly includes a lamp electrode contact and an insulation displacement contact. In a preferred embodiment, the lamp contact is integral with the insulation displacement contact and assembled in a housing.

According to another aspect of the invention, an electrical system is assembled to a vehicle panel by first assembling an electrical accessory to the panel. A conductor is coupled to the accessory and an adhesive is applied to the conductor to secure the conductor to the panel.

According to another aspect of the invention, an electrical system for a vehicle panel is mounted to a panel by assembling insulated conductors having selectively exposed areas in a pattern on a surface of the panel. An adhesive encloses the conductors and secures the conductors to the vehicle panel. Electrical accessories are assembled to the vehicle trim panel where the conductors are exposed.

According to yet another aspect of the invention, a trim panel includes a plurality of conductive layers separated by insulative or dielectric layers. The dielectric layers insulate the conductive layers such that the conductive layers provide a multiple conductor bus for the vehicle panel.

According to a further aspect of the invention, a first conductor having an insulated outer layer is assembled to a second conductor. The conductor having an insulated outer layer is placed adjacent the second conductor and a transducer of a sonic welder is placed into contact with the insulated conductor and an energizing signal is applied to the sonic welder whereby the first conductor moves through the insulated outer layer into contact with the second conductor and sonically welds thereto without removing the insulation from either of the conductors.

In one other aspect of the invention, the vehicle panel includes electrical conductors formed between two layers of the panel. An aperture is formed in the panel to expose the panel conductors. A vehicle accessory is then installed at the aperture such that contacts associated with the accessory directly coupled to the exposed conductors.

In yet another aspect of the invention, a vehicle trim panel includes a ribbon cable for connection with the vehicle accessories. The cable includes an insulator having a channel adapted to receive the conductor. At least one conductor is adapted to be received into the channel and has a generally T-shaped cross-sectional configuration such that a surface of the conductor is exposed when the conductor is flush with and supported in the insulator. A vehicle accessory is adapted to be assembled to the vehicle adjacent the ribbon cable such that a contact on the vehicle accessory is connected with the exposed surface of the generally T-shaped conductor.

A vehicle trim panel is thus provided by the various aspects of this invention which includes electrical accessories that are safely and easily assembled to the panel. The electrical system provides a great degree of flexibility in the arrangement of electrical conductors on the panels and the location of electrical accessories assembled to the panel. Additionally, the panel includes a quick electrical connector which does not include a wire-bundle which shipping and assembly personnel could otherwise use as a handle.

These and other features, objects and advantages of the present invention will become apparent upon reading the following description thereof together with reference to the accompanying drawings in which:

BRIEF DESCRIPTION OF THE DRAWINGS

FIG. 1 is an upward view of a vehicle headliner in place in a vehicle which is equipped with several electrical accessories;

FIG. 2 is a top plan view of the headliner shown in FIG. 1 including an electrical system according to the invention;

FIG. 2a is an enlarged sectional view of a conductor bundle in the headliner taken along section line II—II in FIG. 2;

FIG. 3 is an exploded partially broken-away perspective view of an overhead console for the headliner shown in FIG. 1;

FIG. 4 is an exploded partially broken-away perspective view of a connector assembly for the headliner shown in FIG. 1;

FIG. 5 is an exploded perspective view of the connector assembly of FIG. 4 taken from the direction indicated by arrow V in FIG. 4;

FIG. 6 is a perspective detailed view of a part of the connector assembly shown in FIG. 4;

FIG. 7 is an enlarged cross-sectional view of the connector assembly of FIG. 2, taken along section line VII—VII of FIG. 2;

FIG. 11 is a cross-sectional view of a visor electrical connector assembly taken along the plane XI—XI in FIG. 10;

FIG. 12 is a perspective view of an individual electrical contact member used in the connector according to FIGS. 9–11;

FIG. 13 is an exploded perspective view of the visor connector according to FIG. 8 looking in on upward direction at the several components which make up the mirror connector;

FIG. 14 is a fragmentary cross-sectional view of a bracket and cap;

FIG. 15 is a fragmentary cross-sectional view of an alternate embodiment of the bracket and cap;

FIG. 30 is a side elevational view of an apparatus for assembling the panel conductor to the panel according to FIG. 29;

FIG. 31 is an exploded perspective view of an overhead lamp connection to the panel conductor according to FIG. 29;

FIG. 32 is an exploded perspective view of an alternate embodiment of a connector assembly for connecting the vehicle panel electrical system of FIG. 2 to the vehicle electrical system;

DETAILED DESCRIPTION OF THE PREFERRED EMBODIMENTS

Figure 8:
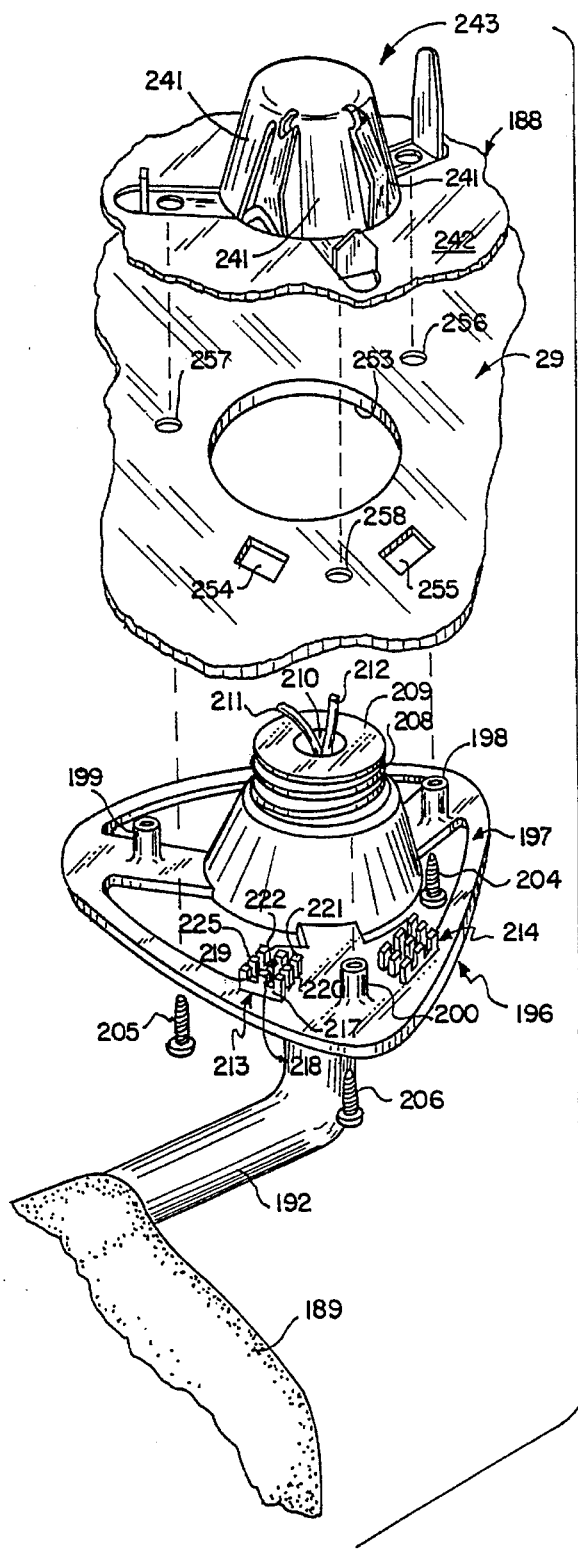
FIG. 8 is an enlarged exploded fragmentary perspective view of the connector for mounting a visor to the headliner and vehicle as shown in FIG. 1.

Referring to FIG. 1, there is shown a panel 29 for a vehicle 30 which has a roof 31, a windshield 32, side windows 33, 34 and 35 and a rear window 36. A rearview mirror 37 is shown attached to windshield 32. Panel 29 is attached to vehicle roof 31 using spring clip fasteners. Visor assemblies 41 and 42 are mounted to vehicle 30 and panel 29 near the "A" pillars on each side of the vehicle. Visor assembly 42 includes a vanity mirror 43 with spaced lights 43' for illuminating the face of the user. An overhead console 44 suspends from panel 29 between visor assemblies 41 and 42. Console 44 includes console lamp assemblies 45 and 46 as well as a compartment 47 which can, for example, be used to store a garage door opener, sun glasses or the like. Overhead lights 49 and 50 are attached to panel 29 and vehicle roof 31. A high-mounted rear stop-lamp assembly 51 is supported on panel 29 adjacent the top of rear window 36.

Panel 29 supports a ribbons cable 55 (FIG. 2) which provides a power bus for the electrical accessories assembled to the panel. An electrical connector 56 is used to connect cable 55 to the vehicle's electrical system.

Somewhat more particularly, vehicle panel 29 is of any suitable construction and may be a door panel, a vehicle headliner or the like. In the illustrated embodiment, panel 29 is a vehicle headliner including a substrate constructed of any suitable material such as fiberboard, fiberglass or any number of molded polymeric materials. One such material is disclosed in U.S. Pat. No. 4,828,910, issued May 9, 1989, and entitled SOUND ABSORBING LAMINATE, the disclosure of which is incorporated herein by reference. Integrally attached to the lower surface of the substrate is a layer of polymeric foam material covered by a suitable decorative fabric. The foam backed fabric is bonded to the substrate material during the molding of the headliner. Another example of a vehicle panel is disclosed in U.S. patent application Ser. No. 07/790,660, filed Nov. 8, 1991, and entitled HEADLINER FOR VEHICLE, now abandoned, the disclosure of which is incorporated by reference.

Ribbon cable 55 of, FIG. 2a, includes four conductors 59–62 separated from one another by electrical opposed grooves 58 (only some of which are numbered) in the insulation between conductors 59–62. The grooves in the invention facilitate the separation of the conductors for connection to insulation displacement contacts (IDCs) (see for example FIGS. 4 and 6). Cable 55 is preferably a commercially available ribbon cable having 16 to 22 gauge conductors. Those skilled in the art will recognize that the actual number of conductors required for a particular electrical system cable is dictated by the requirements of the accessories connected to the panel. Ribbon cable 55 is preferably attached to panel 29 using an adhesive.

In the illustrated embodiment of FIGS. 2 and 2a, ribbon cable 55 is mounted around the perimeter of panel 29 since the illuminated electrical accessories are also positioned about the perimeter. The cable is preferably attached to the panel 29 so that it extends through every location where electrical accessories are mounted.

Overhead console 44, FIG. 3, includes a base 64 and a retaining plate 65 on opposite sides of panel 29. Examples of overhead consoles can be found in U.S. Pat. Nos. 4,505, 054 entitled MAGNETIC SENSOR MOUNTING SYSTEM, issued Mar. 19, 1985; 4,546,551 entitled ELECTRICAL CONTROL SYSTEM, issued Oct. 15, 1985; 4,739,224 entitled LIGHT CONTROL CIRCUIT issued Apr. 19,1988; 4,783,110 entitled CONTAINER HOLDER FOR A VEHICLE issued Nov. 8, 1988; and 5,040,990 entitled MODULAR VEHICLE ELECTRICAL SYSTEM issued Aug. 20, 1991, and U.S. patent application Ser. No. 07/576, 279, entitled CONSOLE MOUNTING SYSTEM filed Aug. 31, 1990, now U.S. Pat. No. 5,106,143, the disclosures of which are incorporated herein by reference.

Base 64 includes generally rectangular housing 66. Housing 66 can be made of a molded polymeric material. Housing 66 includes a top wall 69 having openings 70 and 71 through which console conductors 72, 73, and 76 pass. Conductors 72, 73, and 76 interconnect console lamp assemblies 45 and 46. Housing 66 also includes apertures 77 and 78 which receive threaded fasteners 79 and 80.

Console lamp 45 includes a lamp assembly 84 and a switch 85. Console lamp 46 similarly includes a lamp assembly 86 and a switch 87. A particularly advantageous switch is disclosed in U.S. Pat. No. 4,996,401 entitled SWITCH, issued Feb. 26, 1992, the disclosure of which is incorporated herein by reference. Lamps 84 and 86 and switches 85 and 87 can be mounted to housing 66 using any suitable means such as snap connectors, threaded screws, or adhesive. Switch 85 is a single pole double throw (SPDT) switch which selectively connects battery positive conductor 72 or courtesy conductor 73 to lamp 84 through conductor 90. Switch 87 is also an SPDT switch which selectively connects battery positive conductor 72 or courtesy conductor 73 to lamp 86 through conductor 91. Lamp assemblies 84 and 86 are also connected to battery ground conductor 76.

Generally rectangular console retaining plate 65 is used to mount console base 64 to panel 29. Retaining plate 65 is preferably constructed from a suitable dielectric material such as a molded organic polymer. Mounting plate 65 includes parallel extending arms 94 and 95 having apertures 96 and 97 through which fasteners 79 and 80 can pass. Plate 65 also includes notches 98 and 99 through which conductors 72, 73 and 76 pass. An aperture 100 in panel 29 provides a passage for the console conductors. Mounting plate 65 is larger than aperture 100 so that surface 79 of headliner 29 can support console 44.

Fasteners 103 and 104 are utilized for mounting console 44 to the roof support structure 105 of vehicle 30. Fasteners 103 and 104 are identical, and accordingly only fastener 104 is described in detail. Fastener 104 is a spring clip fastener of the type including a generally rectangular planar base 106 and resilient clip members 107 and 108 projecting upwardly therefrom. A centrally located threaded aperture (not shown) in base 106 receives threaded fastener 79 which extends through housing 66 and retaining plate 65. To attach fastener 104 to support structure 105, the clip members 107 and 108 compress toward one another to move through aperture 109. Once through aperture 109, members 107 and 108 expand to engage upper surface 110 of structure 105. Console housing 66 is preferably mounted directly to the roof support structure 105 using fasteners 103 and 104 to increase the load capacity of console compartment 47 and to secure panel 29 to roof 31 of vehicle 30.

Electrical connector assembly 56 (FIGS. 4 and 5) connects ribbon cable 55 and conductors 72, 73 and 76 in console 44 to wire-bundle 116. Wire bundle 116 is connected to the vehicle electrical system in a conventional manner. Connector assembly 56 includes an upper housing 117 and a lower housing 118 which can be made of any suitable dielectric material, such as a molded polymeric material.

More particularly, lower housing 118 includes four cross-shaped recesses 121–124 (FIG. 5) which hold electrical connectors 127–130. Lower housing 118 also includes aligned notches 132 and 133, which receive cable 55, and aligned notches 134 and 135, which receive conductors 72, 73 and 76. Notches 132–135 allow the lower perimeter edge 136 of housing 118 to abut mounting plate 65 when connector assembly 56 is connected to cable 55. Lower housing 118 also includes apertures 140–143 through which male contact blades 145–148 of connectors 127–130 can project. A wall 139 extends around the upper perimeter of housing 118 and defines a rectangular recess 138 for receipt of upper housing 117. A notch 137 in the top edge of wall 139 receives wire-bundle 116 when upper housing 117 is assembled in lower housing 118.

Electrical system connectors 127–130 are fixedly held in respective channels 121–124 of lower housing 118 by any suitable means such as an adhesive, snap connectors or a friction fit. The electrical system connectors 127–130 are identical, and accordingly, only electrical system connector 127 is described in detail (FIG. 6). Connector 127 includes an elongated body portion 163, an arm 164 projecting downwardly and generally orthogonally at end 165 of body portion 163 and an arm 166 projecting downwardly and generally orthogonally at the opposite end 167 of body portion 163. A male contact blade 145 projects upwardly and generally orthogonally to body 163 at a location intermediate ends 165 and 167. Male contact blade 145 projects through aperture 140 (FIG. 4) in lower housing 118. Body portion 163 is received and held in recess 124.

Arms 164 and 166 are bifurcated and include insulation displacement contacts 170 and 171, respectively. Insulation displacement contact 170 includes slot 172 between blades 173 and 174. Blades 173 and 174 displace insulation enclosing a conductor when a conductor is received in slot 172 enabling an electrical connection to be made. Contact 171 similarly includes slot 176 between blades 177 and 178. Blades 177 and 178 displace insulation 57 when conductor 59 is inserted into slot 176 whereby connector 127 electrically connects to conductor 59. Electrical system connector 127 is preferably stamped from a rigid electrically conductive metal alloy such as brass.

Upper housing 117 includes apertures 151–154 partially enclosing female contacts 157–160 which engage male contact blades 145–148, respectively, when the upper housing 117 is assembled to the lower housing 118. In the illustrated embodiment, the electrical system connector assembly connects conductors of wire-bundle 116 to cable 55 and conductors 72, 73 and 76 in console 44. Lower housing 118 is assembled to panel 29 by pressing the IDCs (e.g. 170, 171) of electrical system connectors 127–130 into engagement with conductors 59–62 and 72, 73 and 76. When the lower housing 118 is assembled to retaining plate 65 of console 44.

Visor assemblies 41 and 42, generally illustrated in FIG. 1, are supported on panel 29 and vehicle support structure 188 (FIGS. 8 and 13) of roof 31. Visor assemblies 41 and 42 are substantially identical in construction, and accordingly only visor assembly 42 will be described in detail. Visor assemblies 41 and 42 can include commercially available electrical accessories such as an illuminated vanity mirror. Examples of visors with illuminated vanity mirrors can be found in U.S. Pat. Nos. 4,227,241, entitled VISOR ASSEMBLY issued Oct. 7, 1980, and 4,500,131, entitled VISOR CONTROL issued Feb. 9, 1985, the disclosures of which are incorporated herein by reference.

Visor 189 (FIGS. 8 and 13) is pivotally mounted to a tubular pivot rod 192 by a torque fitting such as disclosed in U.S. Pat. No. 4,500,131 incorporated by reference above. Pivot rod 192 is attached to panel 29 and vehicle roof 31 by mounting assembly 196. Mounting assembly 196 includes a bracket 197 having a generally triangular configuration with tubes 198–200 spaced approximately 120° apart for threaded fasteners 204–206. Bracket 197 can be constructed of any suitable dielectric material such as a molded organic polymer, so that the bracket is not electrically conductive. Visor pivot rod 192 is movably mounted in a truncated cone shaped support 197' by a conventional compression spring 208 which is terminated in a washer 209 secured to an end 210 of pivot rod 192.

Figure 9:
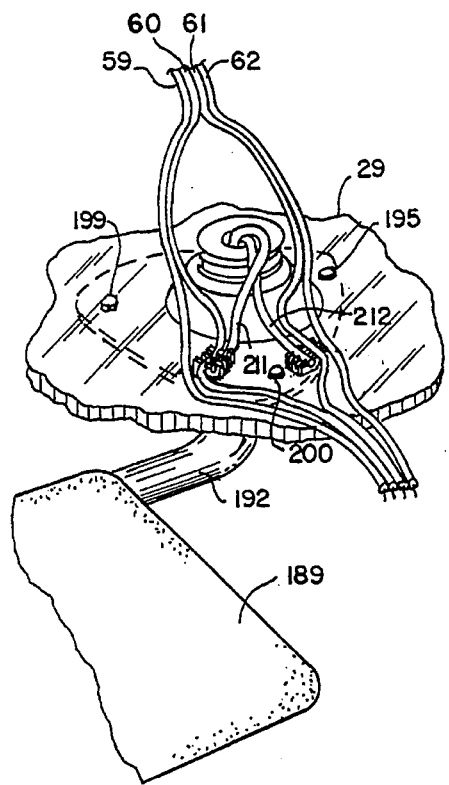
FIG. 9 is a fragmentary perspective view of the visor connector shown in FIG. 8 showing it connected to the headliner and electrical conductors.
Figure 10:
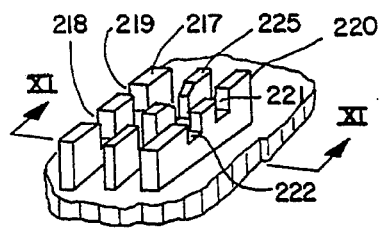
FIG. 10 is a fragmentary perspective view of an electrical connector shown in FIG. 8.

Visor assembly 42 includes conductors 211 and 212 connected to lamps (not shown) in visor 189 and extending through tubular visor pivot rod 192. Bracket 197 includes visor electrical connector assemblies 213 and 214 for connecting visor lamp conductors 211 and 212 to cable conductors 60 and 61 (FIG. 9). Visor connector assemblies 213 and 214 are identical, and accordingly only visor connector assembly 213 is described in detail. Connector assembly 213 (FIG. 10) includes a raised rib 217 with slots 218 and 219 and a raised rib 220 with slots 221 and 222. Slots 218, 219, 221 and 222 receive and support conductors 60 and 211.

An electrical connector 225 (FIGS. 10 and 11) is supported on bracket 197 between ribs 217 and 220. In the preferred embodiment, connector 225 is secured within a recess 237 in bracket 197 by outwardly projecting barbs 238 and 239. Barbs 238 and 239 engage the inner surface of recess 237 and fixedly secure the connector on bracket 197 such that it can not be removed from recess 237.

Connector 225 includes IDCs 226 and 227. IDC 226 includes a slot 228 which receives conductor 211. Blades 229 and 230 displace insulation from conductor 211 to make electrical contact. IDC 227 includes a slot 234 which receives conductor 60. Blades 235 and 236 displace insulation from conductor 60 to make electrical contact.

Visor bracket 197 is mounted to support 188 by mounting cap 243. Examples of visor mounting assemblies including mounting caps can be found in U.S. Pat. Nos. 4,989,911 entitled SNAP-IN VISOR MOUNT issued Feb. 5, 1991; 5,056,853 entitled SNAP-IN VISOR MOUNT issued Oct. 15, 1991; 5,061,005 entitled SNAP-IN VISOR MOUNT issued on Oct. 29, 1991, the disclosures of which are incorporated herein by reference. Mounting cap 243 can be of a fabricated metal or molded polymeric material. Mounting cap 243 includes clip members 241 which engage surface 242 of support structure 188 when the mounting cap is assembled thereto. Details of the clip members of mounting cap 243 may be found in U.S. Pat. Nos. 4,989,911; 5,061,005; and 5,056,853, incorporated herein by reference.

Mounting cap 243 includes ribs 244–247 (FIG. 13) projecting from bottom surface 248. Ribs 244 and 245 can be integrally fabricated with mounting cap 243 or the ribs can be attached to surface 248 by any suitable means such as welding. Cap 243 also includes threaded apertures 250 which receive threaded fasteners 204–206. Ribs 244 and 245 secure conductors 60, 61, 211 and 212 within connector assemblies 213 and 214 when mounting bracket 197 is attached to cap 243 using threaded fasteners 204–206. In one embodiment illustrated in FIG. 14, ribs 244 and 245 on mounting cap 243 abut ribs 217 and 220 on mounting bracket 197. In an alternate embodiment illustrated in FIG. 15, projecting rib 244 is located on mounting cap 243 such that it is positioned between raised rib 217 and connector 225. Projecting rib 245 is located on mounting cap 243 between raised rib 220 and connector 225. Ribs 244 and 245 on mounting cap 243 according to the alternate embodiment of FIG. 15 will push conductors 60 and 211 into IDCs 226 and 227. If mounting cap 243 is constructed of electrically conductive material, ribs 244 and 245 are preferably positioned to engage ribs 217 and 220 on bracket 197 as illustrated in FIG. 14. This ensures that ribs 244 and 245 on cap 243 are spaced from the conductive connector on visor bracket 197.

Panel 29 is secured between bracket 197 and cap 243 and includes openings 253–258. Round opening 253 receives pivot rod support elements including washer 209 and compression spring 208. Rectangular opening 254 receives connector assembly 213. Rectangular opening 255 receives connector assembly 214. Round openings 256–258 receive posts 198–200. Conductors 60, 61, 211 and 212 can be assembled to connector assemblies 213 and 214 (FIG. 9) before cap 243 is attached to bracket 197. Cap 243 is joined to bracket 197 using threaded fasteners 204–206.

Figure 16:
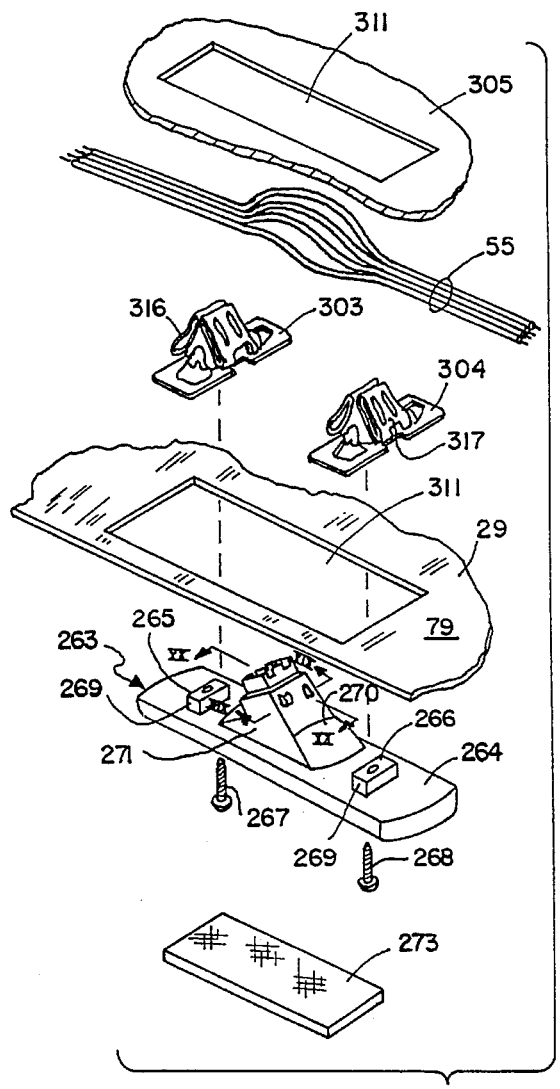
FIG. 16 is a fragmentary, exploded, perspective view of an overhead light assembly as shown supported on the vehicle panel according to FIGS. 1 and 2.
Figure 18:
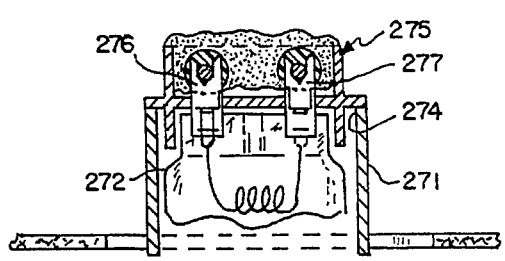
FIG. 18 is a fragmentary cross-sectional view of the overhead light according to FIGS. 16 and 17 taken in the direction XVIII—XVIII in FIG. 2.
Figure 17:
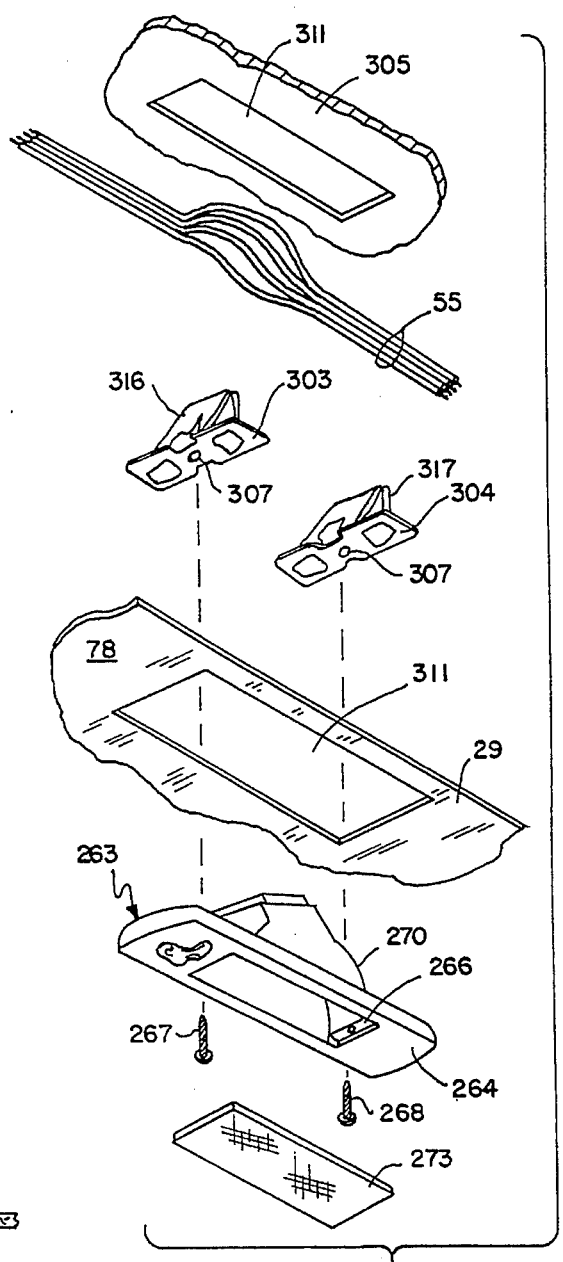
FIG. 17 is a fragmentary, exploded, perspective view of an overhead light according to FIG. 16 looking in an upward direction at the several components which make up the light assembly of FIG. 16.

Overhead lights 49 and 50 (FIGS. 16–18) are also assembled to panel 29 and roof 31. Lights 49 and 50 are identical, and accordingly, only light 49 is described in detail. Light 49 (FIG. 16) includes a housing 263 which can be a molded organic polymer. Housing 263 includes a base 264 having apertures 265 and 266 for receiving threaded fasteners 267 and 268. Apertures 265 and 266 extend through spacer blocks 269 which are integrally formed with housing 263. Housing 263 includes a parabolic reflector 270 and a generally rectangular lamp socket 271 for a lamp 272 (FIG. 18). Parabolic reflector 270 and socket 271 can be formed as separate pieces which are assembled to base 264 by, adhesive, threaded fasteners, or the like. Parabolic reflector 270 includes a generally rectangular opening 274 which receives socket 275. Socket 275 houses connectors 276 and 277 for connection to a source of electrical power. A lens 273 is attached to base 264 by conventional means, not shown, such as snap connectors.

Figure 19:
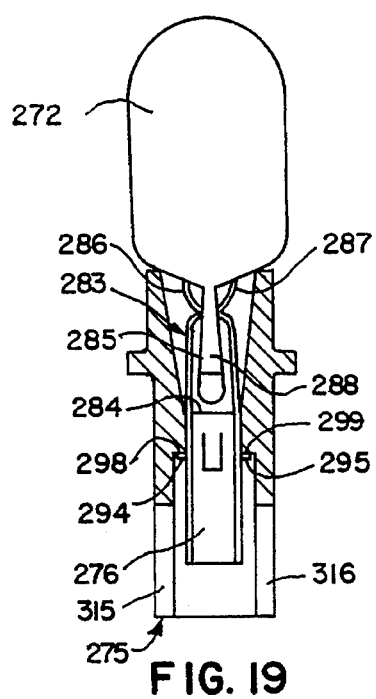
FIG. 19 is a cross-sectional view of a socket taken along plane XIX—XIX in FIG. 16.
Figure 20:
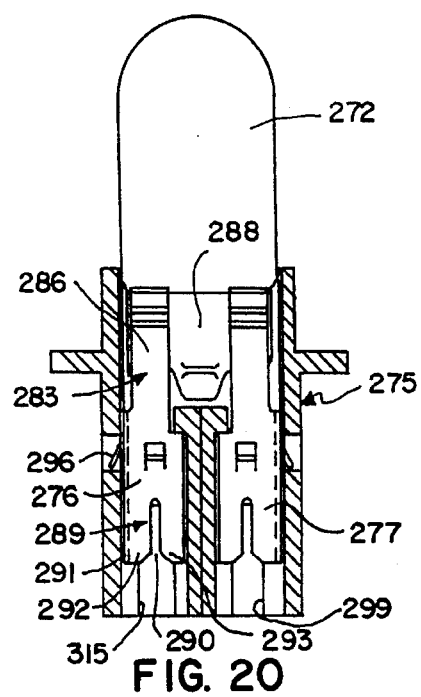
FIG. 20 is a cross-sectional view of a socket taken along plane XX—XX in FIG. 16.

Light connectors 276 and 277 are identical, and accordingly only light connector 276 is described in detail. Light connector 276 (FIGS. 19 and 20) includes spring clip 283 on end 284 for engaging an electrode 285 of a lamp 272. Spring clip 283 includes arms 286 and 287 which engage opposite sides of a base 288 of lamp 272. Connector 276 also includes an IDC 289 having a slot 290 on end 291. Slot 290 receives conductor 60 and blades 292 and 293 on opposite sides of the slot displace insulation from conductor 60. Connector 276 includes extending tabs 294 and 295 on opposite sides of the connectors. Connector 276 also includes a resilient barb 296 on another wall thereof. Tabs 294 and 295 abut walls 298 and 299 and barb 296 is received in opening 300 in socket 275 to secure connector 276 against movement within connector housing 275. Slots 315 and 316 are provided in connector housing 275 to receive conductors 60 and 211. Slots 315 and 316 are aligned with IDC slot 190 in connector 276.

Overhead light 49 (FIG. 17) includes two spring fasteners 303 and 304 which secure light assembly 49 to panel 29 and roof supported structure 305. Fasteners 303 and 304 are substantially identical to fasteners 103 and 104 (FIG. 3) utilized to connect overhead console 44 to roof support structure 105. Fasteners 303 and 304 include centrally positioned threaded apertures 307 and 308 in bases 309 and 310 for receiving threaded fasteners 267 and 268, respectively.

Panel 29 includes an opening 311 for receipt of lamp assembly housing 263. Opening 311 is generally rectangular in configuration and receives spacers 269 and parabolic reflector 270. Support structure 305 includes a rectangular opening 314 which receives fasteners 303 and 304 as well as reflector 270. Base 264 is longer than the length of opening 311 which enables the base to engage surface 79 of panel 29. Spring clips 316 and 317 of fasteners 303 and 304 engage support structure 305 when these fasteners are received in opening 314.

Figure 21:
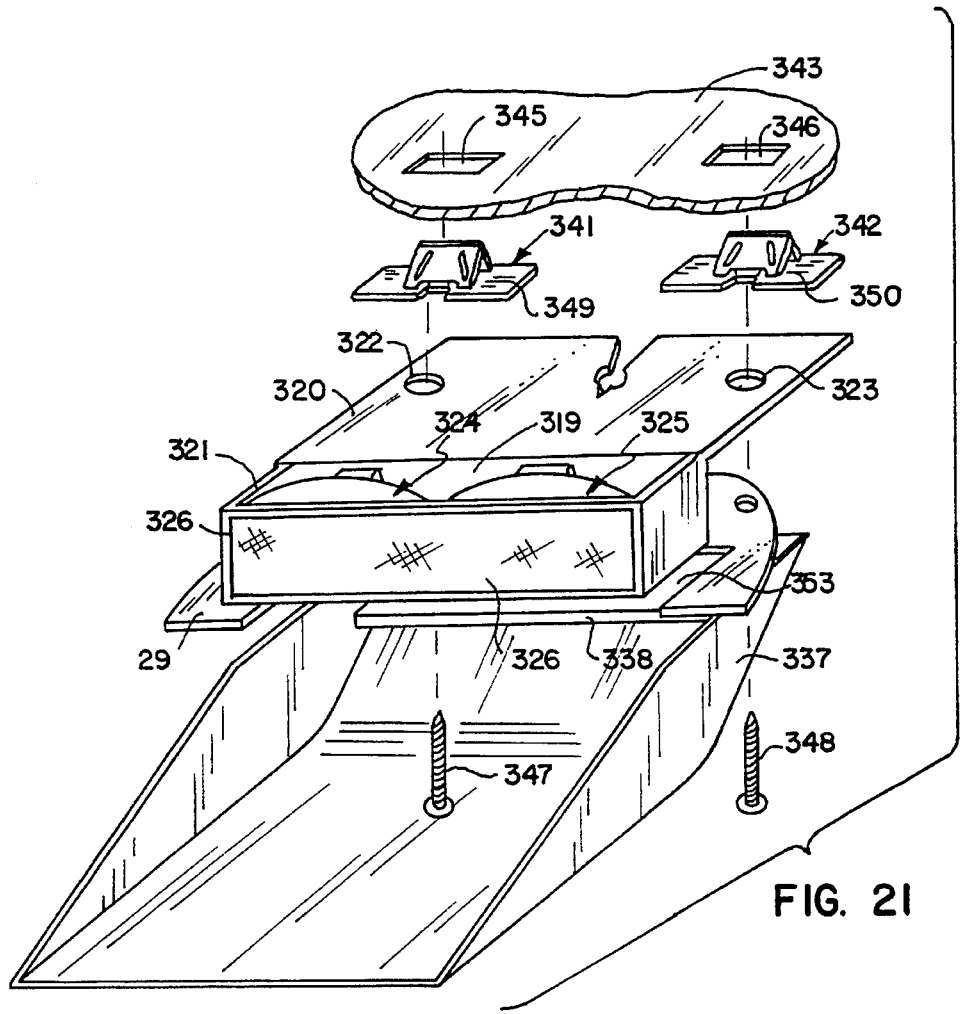
FIG. 21 is an exploded view of a center, high-mounted, stop-lamp assembly supported on the vehicle headliner according to FIGS. 1 and 2.

The center high mounted stop lamp assembly 51 (FIG. 1) provides stop lamp illumination indicating vehicle brake actuation. Stop lamp assembly 51 includes a generally rectangular lamp housing 320 (FIG. 21) and mounting plate 321 having apertures 322 and 323 therein. In the illustrated embodiment, lamp housing 320 and mounting plate 321 are integral. However, mounting plate 321 and housing 320 can be separate units Joined by suitable means such as adhesive, snap connectors, or the like. Housing 320 includes a generally rectangular recess 319 for brake lamp assemblies 324 and 325. The opening 326 of recess 319 includes a red translucent lens 327. Lamp assemblies 324 and 325 are positioned within recess 319 such that lamps therein produce light which is visible through lens 326.

Figure 23:
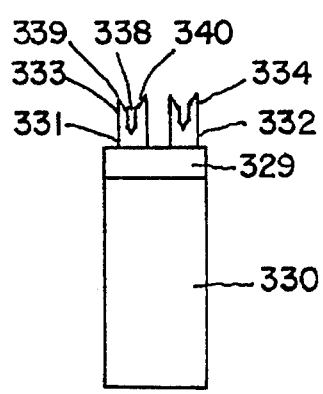
FIG. 23 is a side elevational view of the lamp assembly according to FIG. 22.
Figure 22:
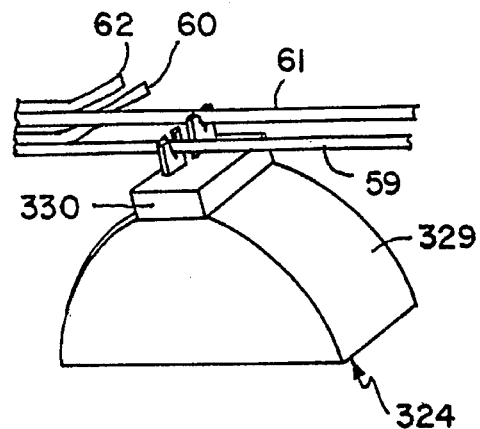
FIG. 22 is a perspective view of a lamp assembly used in the stop-lamp assembly according to FIG. 21.
Figure 24:
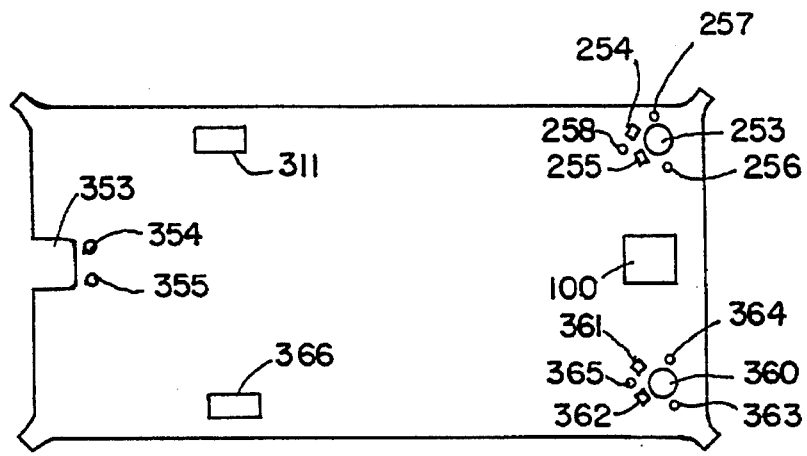
FIG. 24 is a top elevational view of a panel according to FIGS. 1 and 2.
Figure 25:
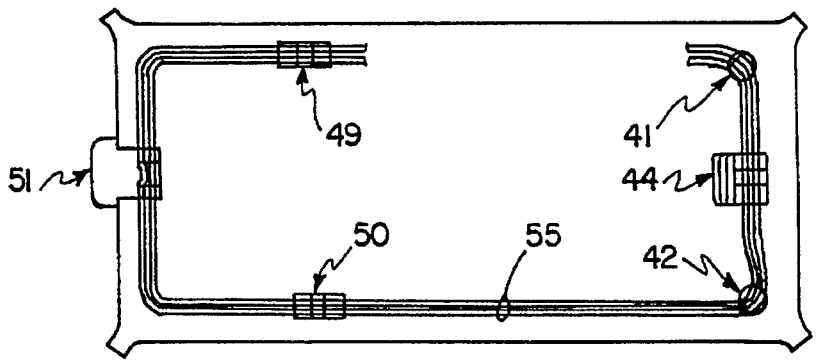
FIG. 25 is a top elevational view of a vehicle panel according to FIG. 24 including a cable assembled thereto.

Stop lamp assemblies 324 and 325 are identical and accordingly, only stop lamp assembly 324 is described in detail. Stop lamp assembly 324 includes a parabolic reflector 329 (FIG. 22) and a generally rectangular lamp receptacle 330. Parabolic reflector 329 and base 330 are of any suitable dielectric material such as a molded polymeric material. A pair of brake lamp connectors 331 and 332 (FIG. 23) project outwardly from base 330. Brake lamp connectors 331 and 332 include IDCs 333 and 334 on outwardly projecting ends and spring clips (not shown) for engaging lamp electrodes on opposite ends thereof. The connectors 331 and 332 are identical and accordingly only IDC 333 is described in detail. IDC 333 includes a slot 338 (FIG. 23) for receiving a conductor between blades 339 and 340 which displace insulation from the conductor.

Stop lamp assembly 51 also includes a cover 337 and a retaining plate 338. Cover 337 encloses the stop lamp assembly as seen from the interior of the vehicle. Retaining plate 338 is positioned on an opposite side of panel 29 from mounting plate 321 for securing the stop lamp assembly on the panel.

Stop-lamp assembly 51 also includes spring fasteners 341 and 342 which secure the stop lamp assembly 51 and panel 29 to roof support structure 343. Fasteners 341 and 342 are identical to fasteners 103 and 104. The fasteners include apertures (not shown) which receive threaded fasteners 347 and 348. Bases 349 and 350 of fasteners 345 and 346 engage headliner 29 when the stop lamp assembly is attached to support structure 343 using fasteners 341 and 342.

The center high-mounted stop-lamp assembly 51 is mounted to panel 29 at notch or cut out 353 (FIGS. 24–28).

Notch 353 is generally rectangular and positioned adjacent rear window 36. Aperture 354 and 355 (FIG. 23) are provided in panel 29 for receiving threaded fasteners 347 and 348.

To assemble the panel according to one method of the invention (FIG. 24), apertures 100, 253–258, 311, 353–355, and 360–366 are cut into panel 29 using a conventional cutting technique. Ribbon cable 55 (FIG. 25) is affixed to underside perimeter of headliner 29 using a commercially available high speed adhesive 356 (FIG. 27) applied to cable 55 and surface 79. No adhesive is applied to cable 55 in the proximity of the apertures to permit a limited amount of manipulation of cable 55 when IDCs on the electrical accessories 41, 42, 44, 49, 50 and 51 are assembled to panel 29. Visor assemblies 41 and 42 are preassembled to panel 29 at apertures 253–258 and 361–365. Visor assembly 41 is assembled in the following manner. Visor bracket 197, including compression spring 208 and washer 209, is inserted through aperture 253. Posts 198–200, and connector assemblies 213 and 214 on bracket 197 project through panel 29 when bracket 197 is preassembled thereto. Conductors 60 and 211 are electrically connected to connector 225 of connector assembly 213 by pressing these conductors into slots 228 and 234 of IDCs 226 and 227. Conductors 61 and 212 are connected to the connector in connector assembly 214 in the same manner. Cap 243 is then fastened to headliner 29. Threaded apertures 250 are aligned with posts 198–200 and threaded fasteners 204–206 are inserted through the posts. With the threaded fasteners tightened into cap 243, panel 29 is secured between bracket 197 and cap 243. Visor assembly 41 is likewise assembled to panel 29 at openings 360–365.

Overhead light 49 is assembled to panel 29 at aperture 311 in the following manner. Parabolic reflector 270 and spacer blocks 269 are inserted through opening 311. Conductors 60 and 61 are inserted into the slots in connectors 276 and 277. The conductors 60 and 61 will thus electrically connect to connectors 276 and 277. Threaded apertures 307 and 308 of fasteners 303 and 304 are aligned with apertures 265 and 266 in base 263, respectively. The bases of fasteners 303 and 304 engage surface 78 of panel 29 adjacent opening 311. Threaded fasteners 267 and 268 are screwed into threaded apertures 307 and 308 of fasteners 303 and 304 which tighten against spacer blocks 369 on base 264. Overhead light 49 is thus secured to panel 29. Overhead light 50 is preassembled to panel 29 at aperture 366 in the same manner as described above for overhead light 49.

Overhead console 44 (FIG. 3) is assembled to headliner 29 at aperture 100. Top wall 69 of housing 64 abuts surface 78 (FIG. 1) of panel 29. Mounting plate 65 is positioned against surface 79 (FIG. 2) of panel 29. Cable 55 and conductors 72, 73, and 76 are positioned over surface 101 between recesses 98 and 99. Threaded fasteners 79 and 80 are inserted through apertures 77 and 78 in base 66 and openings 96 and 97 in mounting plate 65. The threaded fasteners are received in threaded apertures (not shown) in spring clip fasteners 103 and 104. The bases of fasteners 103 and 104 engage surface 79 of panel 29.

Stop lamp assembly 51 (FIG. 21) is assembled to panel 29 at notch 353 (FIGS. 24–28) in the following manner. Housing 320 is inserted into notch 353 such that mounting plate 321 is positioned flush against surface 79 of panel 29. Conductor 59 is pressed into slots 338 of IDCs 333 and 334 such that blades 339 and 340 displace insulation enclosing these conductors. Conductor 61 is likewise connected to IDC 334. Retaining plate 338 is positioned against surface 78 (FIG. 2) of panel 29. Threaded fasteners 347 and 348 are inserted through apertures 354 and 355 (FIGS. 24) in panel 29, apertures (not shown) in retaining plate 338, and apertures 322 and 323 of mounting plate 321. Threaded apertures (not shown) in spring clip fasteners 341 and 342 are aligned with threaded fasteners 347 and 348. The threaded fasteners are received in the threaded apertures in spring clip fasteners 347 and 348 such that the bases 349 and 350 of fasteners 345 and 346 engage surface 79 of panel 29. The threaded fasteners 79 and 80 are tightened onto mounting plate 321 and surface 79 of panel 29 to secure the stop lamp assembly. The cover 337 is then assembled to housing 320 in a conventional manner such as by snap connection.

The headliner panel assembly includes electrical accessories 40, 41, 44, 49, 50, and 51. Electrical connector 56 is utilized to electrically connect panel cable 55 to vehicle cable 116. Base 118 can be mounted to conductors 59–62 and console conductors 72, 73 and 76 before or after the panel is shipped to a vehicle assembly plant. In either case, connectors 127–130 in base 110 are connected to conductors 59–62, 72, 73 and 76 by pressing the conductors into the respective IDC slots of the connectors. Male contact blades 145–148 in base 118 are electrically connected to conductors 59–62. An electrical connector is thus provided which is easy to assembly to a panel and includes no hanging wires which can be used for handles. At the time panel 29 is assembled to vehicle 31, housing 117 is connected to base 118 such that contacts 157–160 connect with blades 145–148. The panel is then mounted to roof 31 using spring-clip fasteners 103, 104 303, 304, 341 and 342 and mounting cap 243.

Figure 26:
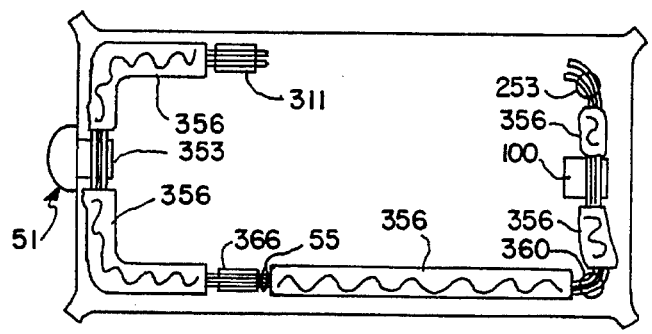
FIG. 26 is a top elevational view of a vehicle panel according to FIG. 25 including adhesive for securing the cable to the panel.

In an alternate method of assembling a panel according to the invention, panel cable 55 is assembled to panel 29 after the electrical accessories are in place. The ribbon cable 55 is then attached to each of the panel accessories as illustrated in FIG. 26.

Figure 27:
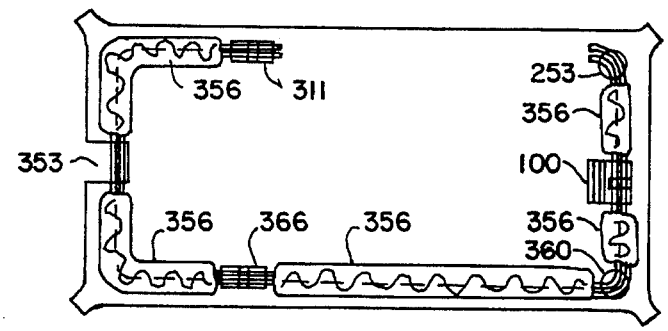
FIG. 27 is a top elevational view of a vehicle panel according to FIG. 26 including electrical accessories assembled to the panel and connected to the cable.
Figure 28:
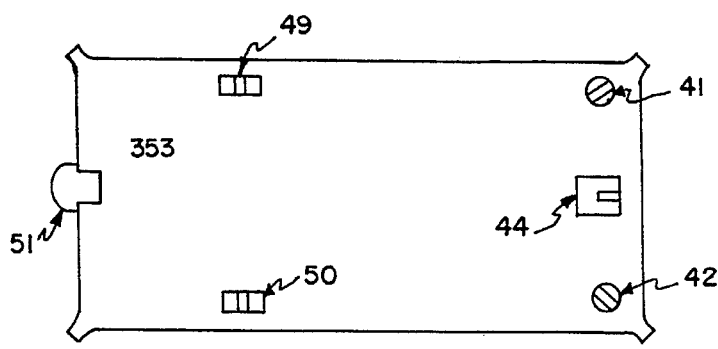
FIG. 28 is a top elevational view of the panel according to FIG. 24 including electrical accessories assembled to the panel.

In another alternate method of assembling the electrical system to panel 29, cable 55 is provided by a single insulated conductor 360 (FIG. 27). Visor assemblies 41, 42, lamp assemblies 49, 50, overhead console 44, and stop lamp assembly 51 are mechanically assembled to panel 29 as described above. Conductor 360 is electrically connected to the IDCs on brake lamp assemblies 324 and 325. The conductor is then run around the perimeter of panel 29 to visor assembly 42. Conductor 360 is then connected to connector assembly 213 of visor assemblies 41 and 42 and IDC 276 on lamp assemblies 49 and 50. Conductor 360 is then connected to IDC 276 on lamp assembly 49, IDC 334 on lamp assemblies 324 and 325, IDC 276 of lamp assembly 50, and connector assembly 214 on visor assemblies 41 and 42. Conductor 360 is next looped and extended back over console 44. An adhesive 356 is then be applied to conductor 360 and surface 79 of panel 29 to secure the conductor on panel 29. The loops in conductor 360 are then cut such that four conductors are provided on the panel.

Figure 29:
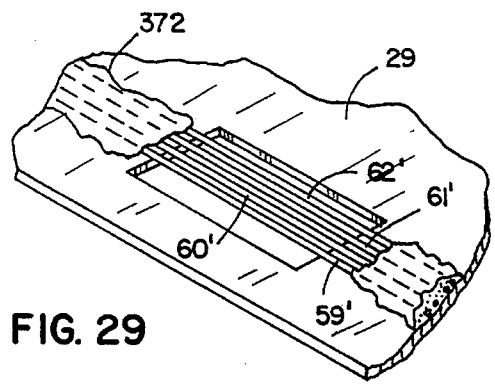
FIG. 29 is a fragmentary perspective view of an alternate embodiment of the panel according to FIG. 1.

In yet another embodiment of the invention, four uninsulated conductors 59'–62' (FIG. 29) are fed through counter rotating rollers 370 and 371 (FIG. 30) and positioned in contact with panel 29. An adhesive 372 is applied to the exposed conductors on surface 79 of panel 29. The adhesive is preferably commercially available dielectric high speed adhesive. The adhesive encloses conductors 59'–62' such that the adhesive provides electrical insulation for each of the conductors and secures the conductors on panel 29. At each of openings 100, 253, 311, 353, 360 and 366 on panel 29, no adhesive is applied over the conductors. Exposed conductors are thus provided across each of these openings. The IDCs in electrical accessories 41, 42, 44, 49, 50 and 51 are connected to conductors 59'–62' as illustrated in FIG. 31 when the electrical accessories are mounted on the panel as described above. Those skilled in the art will recognize that the electrical accessories may alternatively be mounted to exposed conductors 59'–62' using conventional means such as clips, welding, or the like. The exposed conductors provide a great degree of flexibility in assembling electrical accessories to panel 29.

Figure 33:
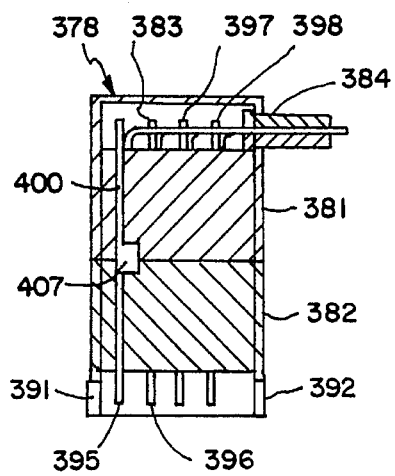
FIG. 33 is a fragmentary side cross-sectional view of the connector according to FIG. 32 taken along plane XXXIII—XXXIII in FIG. 32.

An electrical connector assembly 375, an alternate embodiment of connector assembly 56, is illustrated in FIGS. 32 and 33. Connector assembly 375 is used to connect conductors 59–62 of cable 55 to conductors 162–165 of wire-bundle 116 when console 44 does not include electrical accessories. Electrical connector assembly 375 includes a connector housing 378 (FIG. 33) and a base 376. Base 376 is supported on accessory retaining plate 65. Base 376 may be integrally formed with accessory mounting plate 65 or attached thereto. The base includes integral upwardly projecting snap connectors 379 and 380 for securing the connector housing 378 to base 376. In the illustrated embodiment, snap connectors 379 and 380 are provided on opposite sides of the base and define a channel 385 through which cable 55 extends. Each of the snap connectors includes an inwardly and downwardly sloped surface 386 which terminates at a shoulder 389.

Connector housing 378 of connector assembly 375 includes a generally rectangular top housing section 381 and a generally rectangular bottom housing section 382. Housing section 381 includes an opening 384 through which wire-bundle 116 enters chamber 383. Housing section 382 has opposed ridges 387 and 388 on the exterior thereof for engagement with snap connectors 379 and 380 of base 376. Housing section 382 also includes recesses 391 and 392 which receive conductors 59–62 of cable 55. Housing sections 381 and 382 include respective aligned for receipt of each of connectors 395–398.

Electrical connectors 395–398 are mounted within connector housing 378. Electrical connectors 395–398 are identical, and accordingly, only electrical connector 395 is described in detail. Connector 395 includes an elongated generally rectangular body portion 400. Body portion 400 has a pair of extending portions at one end which form an insulation displacement contact (IDC) 401. IDC 401 has a slot 403 which receives conductor 59 and blades 405 and 406 on opposite sides of slot 403 for displacing insulation from the conductor. The opposite end of connector 395 is connected to conductor 162. Connector 395 and conductor 162 are preferably connected by ultrasonically welding. A tab 407 extends generally orthogonally from body 400 intermediate ends 402 and 410 to hold the connector in a fixed position within housing sections 381 and 382.

Conductors 162–165, which are in wire-bundle 116, are connected to cable 55 when housing 378 is assembled to base 376. To assemble housing section 381 to base 376, conductors 59–62 of cable 55 are received in the respective slots 403 of the IDCs on connectors 395–398. Blades 405 and 406 displace the insulation on conductors 59–62 such that connectors 395–398 electrically connect with conductors 59–62. When housing 378 is fully attached to base 376, shoulders 389 of snap connectors 379 and 380 engage ridges 387 and 388 projecting outwardly from housing section 381.

Figure 34:
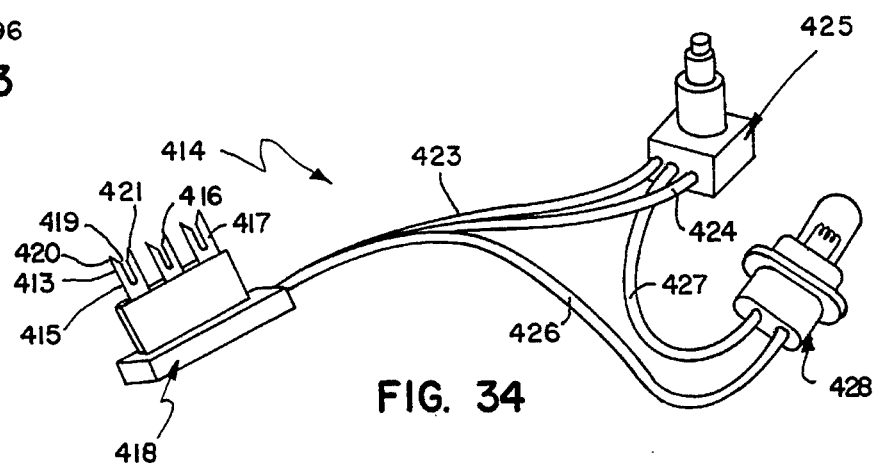
FIG. 34 is a perspective view of an alternate embodiment of an overhead lamp assembly for the panel according to FIGS. 1 and 2.

Light arrangement 414 (FIG. 34) is an alternate embodiment of the overhead light 49. Light arrangement 414 includes a connector housing 418, a lamp socket 420, and a switch 425. Connector housing 418 includes three connectors 415–417 each of which has an IDC on the exposed end thereof. IDC 413 includes a slot 419 for receiving a conductor. Blades 420 and 421 on both sides of slot 419 displace insulation on a conductor received in slot 419. A conductor can be connected to the internal ends (not shown) by any suitable means, such as welding.

Connectors 415 and 417 are connected to switch 425 by conductors 423 and 424. Switch 425 is connected to socket 428 through conductor 427. Socket 420 is connected to connector 416 through conductor 426. Switch 425 can be any suitable single pole double throw switch such as the switch disclosed in U.S. Pat. No. 4,996,401, incorporated hereinabove.

Figure 35:
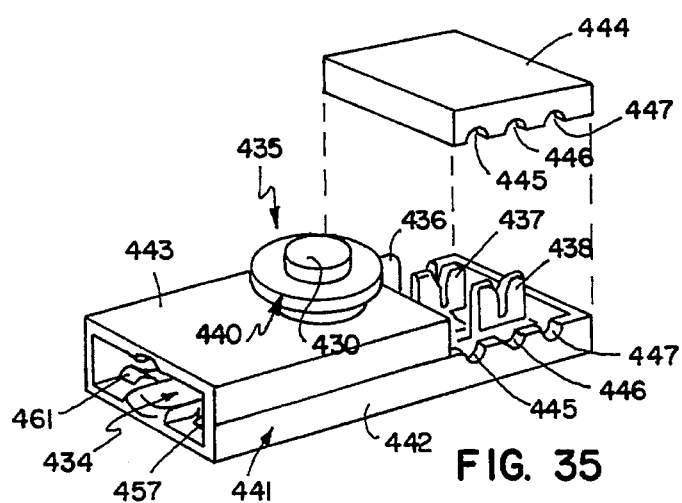
FIG. 35 is a partially exploded perspective view of an alternate embodiment of the overhead light according to FIGS. 1 and 2.

A lamp assembly 433 (FIG. 35) according to yet another embodiment of overhead lamp assembly 49 includes a socket 434, a switch 435, within the assembly, and IDCs 436–438 in a housing 441. Housing 441 includes a base 442, a top 443, and a cover 444 preferably made a molded polymeric material. Top 443 and cover 444 can be attached to base 442 using conventional means.

Figure 36:
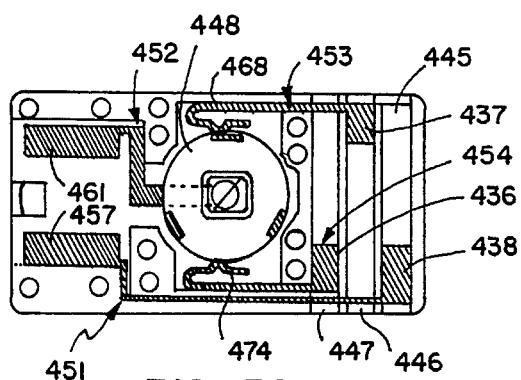
FIG. 36 is a top elevational view of a base including contacts for the overhead light according to FIG. 35.

Top 443 includes a push-button assembly 440 which controls the operation of switch 435. Push button assembly 440 includes a plunger 430, an intermediate member and a contact holding member such as those described in U.S. Pat. No. 4,996,401, incorporated hereinabove. A moveable contact 448 (FIG. 36) is supported on the contact holding member. Base 442 includes connector channels 445, 446, and 447, a switch base 449, and defines half of lamp socket 434. The other half of lamp socket 434 is defined by top 443. Channels 445–447 in base 442 receive conductors 61, 60, and 62, respectively, of cable 55.

Figure 37:
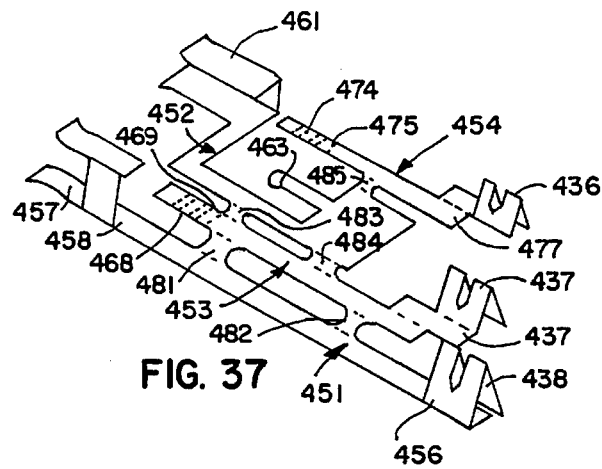
FIG. 37 is perspective view of a stamping utilized in the overhead light according to FIG. 36.

Base 442 houses electrical connectors 451–454 (FIG. 37). Connector 451 includes IDC 438 on an end 456 thereof and a female contact 457 on an opposite end 458 for engaging an electrode (not shown) of a lamp (not shown). Connector 452 includes a female contact 461 for engaging a lamp electrode and a contact 463 which is utilized in switch 435 as described hereinbelow. Connector 453 includes a contact 468 utilized in switch 435 on end 469, and on IDC 437 on an end 471 opposite end 469. Connector 454 includes a contact 474 utilized in switch 435 on an end 475 and on IDC 436 on an end 477 opposite end 475. In the embodiment illustrated in FIG. 37, connectors 451–454 are stamped as single unit. Connector 451 is connected to connector 451 by punch-outs 481 and 482. Connector 452 is connected to connector 450 by punch-outs 483 and 484. Connector 452 is connected to connector 454 by punch-out 485.

To assemble the lamp assembly 433, connectors 451–454 are separated at punch-outs 481–485. Connectors 451–454 are individually assembled in base 442. Connector 451 is mounted in base 442 such that IDC 438 is located in channel 444. Contact 457 is positioned in base 442 to connect with an electrode of a lamp inserted in socket 434. Connector 452 is mounted in base 442 such that contact 463 is positioned below contact 448. Female contact 461 of connector 452 is located in base 442 to connect with an electrode of a lamp inserted in socket 434. Connectors 453 and 454 are mounted in base 442 such that IDCs 437 and 436 are located within channels 446 and 447 of base 442 to connect with conductors 60 and 62, respectively. Contacts 468 and 474 are positioned within base 442 such that they alternately contact moving contact 448 when the push button 430 is actuated. Accordingly, contact 437 is connected to battery positive lead 60 and contact 474 is connected to courtesy lead 62. Top 443 and cover 444 are attached to base 442 using snap connectors, threaded fasteners or the like. The light is thus compact, inexpensive to manufacture, and easy to assemble to a panel. Light 414 can be used with any panel accessory.

In operation, a lamp connected in socket 434 is controlled by switch 435. Switch 435 is preferably a SPDT spring loaded push-button switch. Moveable contact 448 selectively engages radially spaced contacts 468 and 474 when plunger 430 is actuated. Contact 448 continuously engages contact 463. The switch accordingly alternately connects socket 434 to the courtesy signal and battery positive. Accordingly, when switch 435 connects the socket to battery positive, a lamp in socket 434 is illuminated regardless of whether the vehicle doors are opened or closed. Otherwise, the lamp in socket 434 will only be illuminated when the courtesy signal is provided, such as when one of the vehicle doors is open.

Figure 38:
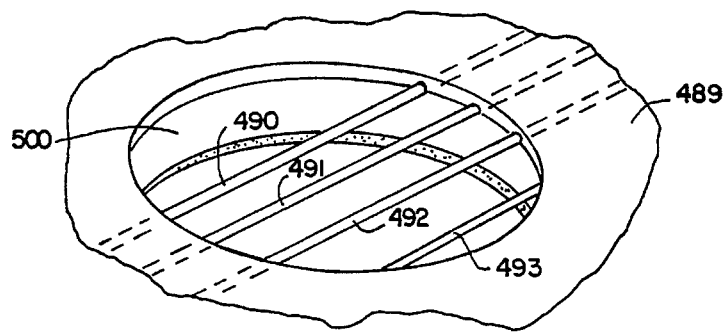
FIG. 38 is a perspective view of a vehicle panel according to an alternate embodiment of the invention.

In yet another embodiment of the invention (FIG. 38), conductive strips 490–493 are formed within a panel 489. Conductive strips 490–493 are approximately 18 to 22 gauge uninsulated conductors. The conductors are positioned between dielectric layers of the panel when the panel is molded. For example, the conductive strips 490–493 may be between a core 494 and a substrate 495 such as those in panel 29 described above. The conductors can be fed into conventional panel molding machinery (not shown) as the material from which the panel layers are formed enters the molding machinery. After the panel is formed, aperture 500 is cut into panel 489 using conventional means, such as water under pressure, to expose conductors 490–493. An electrical accessory can then be assembled to the panel at aperture 500 such that the accessory electrically connects with conductors 490–493.

Figure 39:
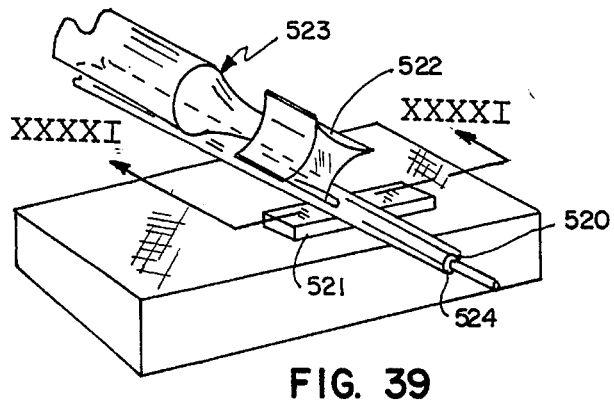
FIG. 39 is a perspective view of an ultrasonic welder for interconnecting conductors.
Figure 40:
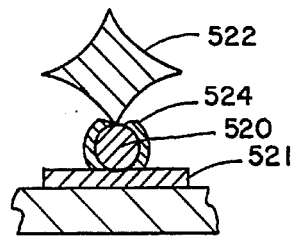
FIG. 40 is a fragmentary cross-sectional view of the welder along plane XXXXI—XXXXI in FIG. 39.

In yet another aspect of the invention illustrated in FIGS. 39 and 40, an insulated conductor 520 is attached to an uninsulated conductor 521 using ultrasonic welder 523. The insulated conductor 520 is placed over the non-insulated conductor 521. A transducer tip 522 of sonic welder 523 is then aligned with the longitudinal axis of conductor 520 and pressed into the insulation 524 of insulated conductor 520, an ultrasonic signal is then applied to the transducer tip 522 to bond the conductors together. Conductor 520 is preferably a 16–20 gauge single-wire conductor with cross-linked PVC insulation. Conductor 521 is preferably 80/20 brass. Any suitable ultrasonic welder can be utilized to implement the method, such as a Stapla "Condor" system. In one implementation of the method according to the invention, a signal was applied to transducer tip 22 which had a frequency of approximately 20 KHz at between 150–200 watt seconds. A clamp force of between 2 and 2.5 bars was applied between the transducer and the conductor. The total weld time was between 0.5 and 0.6 seconds. Tip 522 caused a separation of the insulation so that the conductor within pressed through and welded to the other conductor. The pressure applied by transducer 22 can be greater when transducer 22 is moving through insulation 524 and can then be reduced when conductor 520 is welded. The two conductors can thus be sonically weld together without requiring that the insulation be removed from the insulated conductor.

Figure 41:
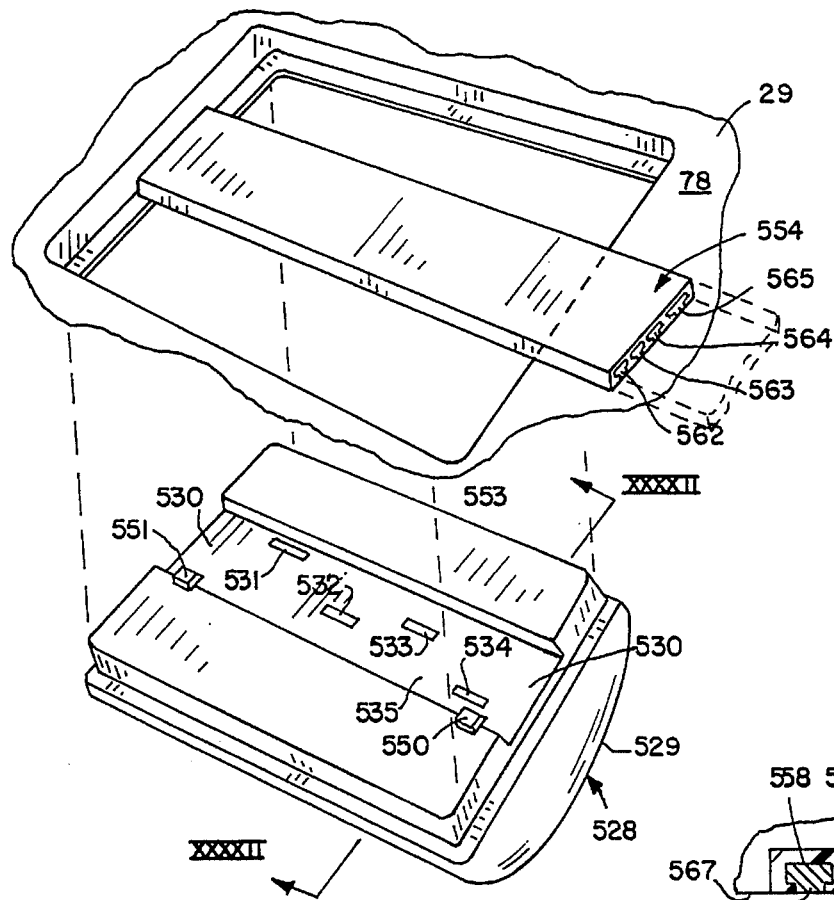
FIG. 41 is an exploded perspective view of a ribbon cable and module according to an alternate embodiment of the panel according to FIG. 1.
Figure 42:
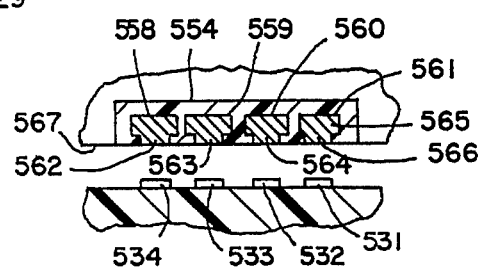
FIG. 42 is a cross-sectional view of a ribbon cable and connector according to FIG. 41 taken along plane XXXXII—XXXXII in FIG. 41.
Figure 43:
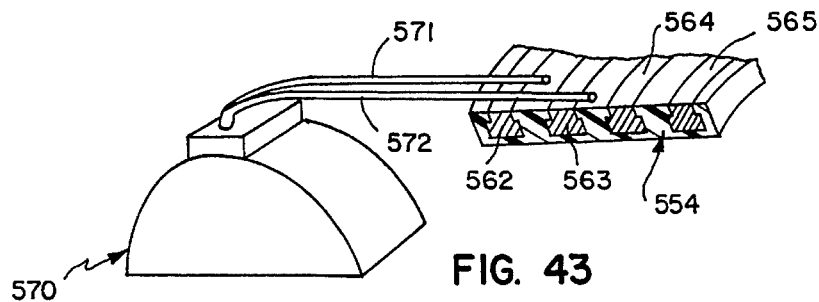
FIG. 43 is a fragmentary perspective view of a cable and lamp assembly according to an alternate embodiment of the lamp and cable assembly according to FIGS. 41 and 42.

Another embodiment of the invention is illustrated in FIGS. 41 and 42. A base module 528 shown therein can be, for example, an overhead dome light for a panel. Module 528 includes a housing 529 having a longitudinally recessed track 530. A plurality of spaced contacts 531, 532, 533 and 534 extend outwardly from the surface 535 of track 530. Contacts 531–534 can be made of beryllium copper or other spring like conductive material and are coupled to courtesy lamps within housing 529. Housing 529 also includes latch connectors 550 and 551 shown schematically in FIG. 41 for mounting base unit 528 within a recess 553 in the panel 29. Extending longitudinally across recess 553 is a ribbon-like connector 554 made of a flexible polymeric non-conductive material having longitudinally extending generally T-shaped conductors 558–561 formed therein. As illustrated in FIG. 42, when module 528 is snapped into position within recess 553, the spaced electrical contacts 536–539 engage strips 562–565. In FIGS. 41 and 42, only four contacts and contact strips are shown. It is within the scope of its present invention to use as few or as many conductors as desired to electrically connect the assemblies.

Figure 44:
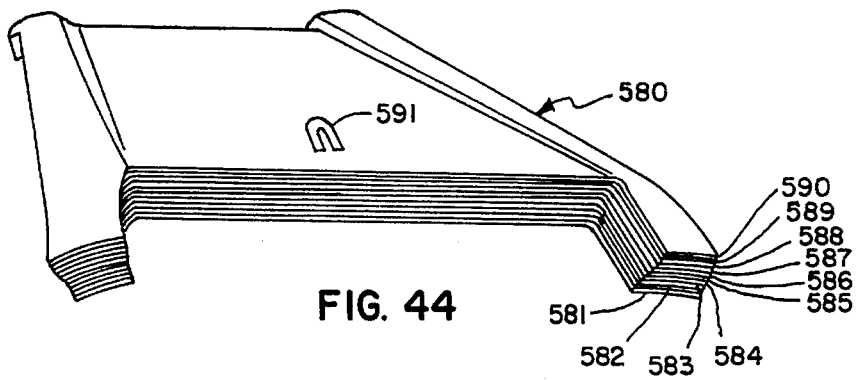
FIG. 44 is a perspective view of an alternate embodiment of the vehicle panel illustrated in FIG. 1.

In still another aspect of the invention, a vehicle panel 580 as illustrated in FIG. 44, includes multiple layers. The panel 580 can include an outer decorative layer 581, a thin substrate 582; a conductive layer 583; an insulator layer 584; a conductive layer 585; an insulator layer 586; a conductive layer 587; an insulator layer 588; a conductive layer 589; and an outer substrate 590. Substrates 582 and 590 can be of a suitable dielectric material such as a polymeric material, fiberglass foam, cardboard, or the like. The conductive layers can be provided by sheet copper, aluminum, or the like having a thickness between 0.00025" and 0.00035", and preferably copper sheet having a thickness of 0.00030". The insulator layers can be 30 point craft paper. The panel layers can be bonded together using any suitable adhesive such as a poly vinyl acetate.

Figure 45:
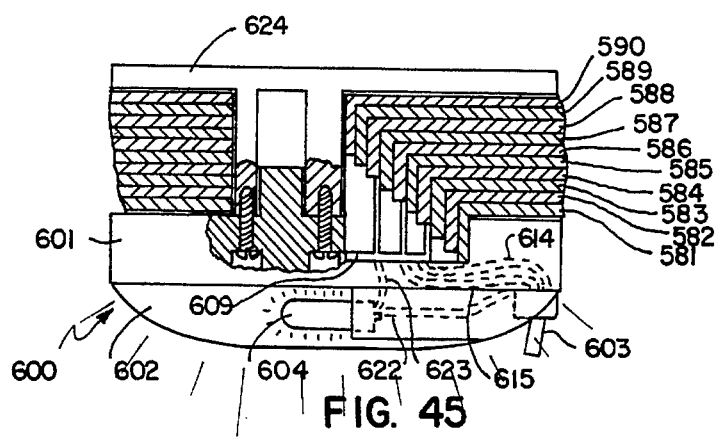
FIG. 45 is a partial cross-sectional view of a panel take along plane XXXXV—XXXXV in FIG. 47 and an electrical accessory for attachment to the vehicle panel of FIG. 44.
Figure 46:
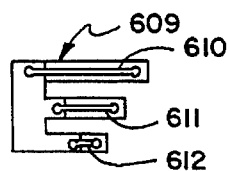
FIG. 46 is a top view of a flexible printed circuit board for the electrical accessory of FIG. 44.
Figure 47:
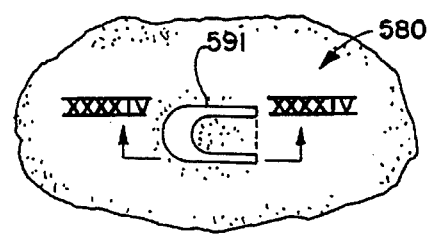
FIG. 47 is a fragmentary top elevational view of the panel according to FIG. 44.

An overhead dome light 600 (FIG. 45) is shown connected to panel 580 and electrically connected to layers 583, 585, 587 and 589. Lamp 600 includes a base 601, a transparent cover 602, a switch 603, and a lamp 604. The light also includes a flexible printed circuit board 609 (FIG. 46) including conductors 610, 611 and 612. In the illustrated embodiment Conductor 610 is connected to conductive layer 587, conductor 611 is connected to conductive layer 585 and conductive layer 587 is connected to conductive layer 583. Conductors 614 and 612 are connected to conductor switch 613 through conductors 614 and 615 respectively. Conductor 610 is connected directly to lamp 604 through conductor 623. Switch 603 is connected to lamp 604 through conductor 522. The dome lamp further includes a lamp mounting plate 624. Threaded fasteners 625 and 626 are utilized to secure dome lamp base 601 to mounting plate 624.

Thus, it can be seen that an electrical system for a vehicle panel is disclosed which is easy to assemble. A variety of electrical accessories can be assembled to the panel quickly with a minimum amount of labor workers. The connectors provide a secure connection of accessories to the panel.

Although the electrical system and method of assembling the electrical system are illustrated for a vehicle headliner, those skilled in the art will recognize that they are also applicable to other vehicle panels, such as vehicle door panels. Accordingly, modifications to the preferred embodiments of the invention as described herein can be made by those skilled in the art without departing from the spirit or scope of the invention as defined by the appended claims.

The embodiments of the invention in which an exclusive property or privilege is claimed are defined as follows.

1. A decorative vehicle trim panel assembly, comprising:

a panel adapted to be mounted to a vehicle, said panel having at least one aperture formed therein;

at least one panel conductor carried on said panel and fixed to said panel to extend across at least a portion of said at least one aperture, said at least one panel conductor adapted to be connected to the vehicle's electrical system; and an electrical accessory adapted to be carried on said panel, said electrical accessory including at least one accessory conductor and at least one insulation displacement contact coupled to said accessory conductor, said at least one insulation displacement contact being connected to said at least one panel conductor through said at least one aperture.

2. The decorative vehicle trim panel assembly as defined in claim 1 wherein said electrical accessory includes a lamp receptacle, said lamp receptacle including at least one contact coupled to said at least one accessory conductor.

3. The decorative vehicle trim panel assembly as defined in claim 2 wherein said electrical accessory further includes a switch, a first terminal of said switch coupled to said at least one lamp contact and a second terminal of said switch connected to said at least one insulation displacement contact whereby said switch selectively connects said first terminal to said second terminal to control operation of said electrical accessory.

4. The decorative vehicle trim panel assembly as defined in claim 3, wherein said electrical accessory further includes a housing, and wherein said lamp receptacle and said switch are positioned within said housing.

5. The decorative vehicle trim panel assembly as defined in claim 4 wherein said vehicle accessory further includes a connector and said switch includes at least one switch contact, said connector is supported within said housing and including one of said at least one lamp contact and one of said at least one switch contact.

6. The decorative vehicle trim panel assembly as defined in claim 1, wherein said at least one panel conductor includes a plurality of panel conductors providing a multi-conductor electrical bus for said panel.

7. The decorative vehicle trim panel assembly as defined in claim 6 wherein said plurality of conductors are provided in a ribbon cable.

8. The decorative vehicle trim panel assembly as defined in claim 6 wherein said electrical accessory is a lamp assembly.

9. The decorative vehicle trim panel assembly as defined in claim 6 wherein said electrical accessory is in an overhead console.

10. The decorative vehicle trim panel assembly as defined in claim 1 wherein said panel is a vehicle headliner.

11. The decorative vehicle trim panel assembly as defined in claim 1 further including at least one panel conductor connected to the vehicle electrical system and at least one electrical system connector adapted to be connected to said at least one panel conductor, said electrical system connector including a first insulation displacement contact adapted to connect to said at least one panel conductor whereby said electrical system connector insulation displacement contact is connected to said at least one panel conductor to connect said at least one panel conductor to the vehicle electrical system.

12. The decorative vehicle trim panel assembly as defined in claim 11 wherein said electrical accessory includes at least one accessory conductor, and wherein said at least one electrical system connector includes a second insulation displacement contact adapted to connect to said accessory conductor.

13. The decorative vehicle trim panel assembly as defined in claim 1, wherein said vehicle accessory is a center high-mounted stop-lamp including at least one lamp, said at least one stop lamp including at least one insulation displacement contact.

14. The decorative vehicle trim panel assembly as defined in claim 13, wherein said center high mounted stop lamp includes two lamp assemblies positioned within a common housing, wherein said housing is adapted to be mounted to said panel.

15. The decorative vehicle trim panel assembly as defined in claim 14, wherein each of said lamp assemblies include at least one insulation displacement contact whereby said lamps are connected to said panel conductor.

16. The decorative vehicle trim panel assembly as defined in claim 1, wherein said accessory is a vehicle visor assembly.

17. The decorative vehicle trim panel assembly as defined in claim 16, wherein said visor assembly includes a bracket including means for supporting a visor pivot rod on said bracket, and said bracket including means for connecting at least one visor electrical conductor connected to a vanity mirror lamp to at least one panel electrical conductor on said vehicle panel.

18. The decorative vehicle trim panel assembly as defined in claim 16, wherein said connecting means includes an electrical connector adapted to connect with said at least one panel electrical conductor and said at least one accessory electrical conductor.

19. The decorative vehicle trim panel assembly as defined in claim 16, further including a mounting cap.

20. The decorative vehicle trim panel assembly as defined in claim 19, further including means for assembling said bracket to said mounting cap such that the vehicle panel is positioned between said bracket and said mounting cap.

21. The decorative vehicle trim panel assembly as defined in claim 20, wherein said mounting cap includes means for securing the conductor in said connector when said bracket is assembled to said mounting cap.

22. The decorative vehicle trim panel assembly as defined in claim 21, wherein said at least one insulation displacement contact is fixedly secured to a surface of said bracket.

23. The decorative vehicle trim panel assembly as defined in claim 1, wherein said at least one insulation displacement contact is fixedly secured to a surface of said electrical accessory.

24. A decorative vehicle trim panel assembly comprising:

a panel adapted to be mounted to a vehicle;

at least one panel conductor carried on said panel, said at least one panel conductor adapted to be connected to the vehicle's electrical system;

an electrical accessory adapted to be carried on said panel, said electrical accessory including at least one accessory conductor and at least one insulation displacement contact coupled to said accessory conductor, said at least one insulation displacement contact being connected to said at least one panel conductor; and at least one panel conductor connected to the vehicle electrical system and at least one electrical system connector adapted to be connected to said at least one panel conductor, said electrical system connector including a first insulation displacement contact adapted to connect to said at least one panel conductor whereby said electrical system connector insulation displacement contact is connected to said at least one panel conductor to connect said at least one panel conductor to the vehicle electrical system, wherein said electrical accessory includes at least one accessory conductor, and wherein said at least one electrical system connector includes a second insulation displacement contact adapted to connect to said accessory conductor, and wherein said at least one electrical system connector includes first and second arms extending from a shoulder, said first and second arms extending substantially in parallel, said first and second arms including a respective one of said first and second insulation displacement contacts, respectively, for receiving said accessory conductor and said panel conductor, respectively.

25. The decorative vehicle trim panel assembly as defined in claim 24, further including a female contact connected to an end of said accessory conductor, whereby said female contact is adapted to engage said electrical system connector.

26. The decorative vehicle trim panel assembly as defined in claim 25, wherein said accessory is a vehicle visor assembly.

27. The decorative vehicle trim panel assembly as defined in claim 26, wherein said visor assembly includes a bracket including means for supporting a visor pivot rod on said bracket, and said bracket including means for connecting at least one visor electrical conductor connected to a vanity mirror lamp to at least one panel electrical conductor on said vehicle panel.

28. The decorative vehicle trim panel assembly as defined in claim 26, wherein said connecting means includes an electrical connector adapted to connect with said at least one panel electrical conductor and said at least one accessory electrical conductor.

29. The decorative vehicle trim panel assembly as defined in claim 26, further including a mounting cap.

30. The decorative vehicle trim panel assembly as defined in claim 29, further including means for assembling said bracket to said mounting cap such that the vehicle panel is positioned between said bracket and said mounting cap.

31. The decorative vehicle trim panel assembly as defined in claim 30, wherein said mounting cap includes means for securing the conductor in said connector when said bracket is assembled to said mounting cap.

32. The decorative vehicle trim panel assembly as defined in claim 24, wherein said at least one accessory conductor includes a plurality of accessory conductors and said at least one panel conductor includes a plurality of panel conductors, the number of panel conductors at least equal to the number of accessory conductors, and wherein the number of electrical system connectors is equal to the number of panel conductors.

33. A vehicle panel assembly comprising:

a panel including a first outer layer, a second outer layer, and at least three electrically conductive layers between said outer layers; and an electrical accessory adapted to be assembled to said panel, said electrical accessory including at least one electrical conductor adapted to be connected to at least one of said electrically conductive layers, whereby said electrical accessory is connected to said one electrically conductive layer at any location on said panel by cutting an aperture in said panel to access said electrically conductive layers.

34. The vehicle panel assembly as defined in claim 33, wherein said electrically conductive layers of said panel are separated by dielectric layers.

35. The vehicle panel assembly as defined in claim 34 wherein said electrical accessory includes a mounting plate and a base, wherein said mounting plate is positioned on one side of said panel aperture and said base is positioned on another side of said panel and connected to said mounting plate to assemble said electrical accessory to said panel.

36. The vehicle panel assembly as defined in claim 33 and further including a second electrical accessory adapted to be assembled to said panel, said second electrical accessory including at least one electrical conductor adapted to be connected to at least one of said electrically conductive layers, whereby said second electrical accessory is connected to the at least one electrically conductive layer at any location on said panel by cutting a second aperture in said panel to access said electrically conductive layers.

37. The vehicle panel assembly as defined in claim 36, wherein a third one of said electrically conductive layers is connected to, and provides an electrical ground to, said electrical accessories.

38. A method of providing a vehicle panel including electrical accessories comprising the steps of:

forming a vehicle panel including at least three electrical conductors therein;

forming at least one aperture in said vehicle panel to expose said at least three conductors in said panel, said at least one aperture adapted to receive a vehicle accessory; and mounting said vehicle accessory in said aperture in said panel such that said vehicle accessory connects to said at least one of said conductors.

39. The method as defined in claim 38, wherein said step of mounting said vehicle accessory includes a step of positioning an accessory on one surface of said panel and positioning a mounting means on another side of said panel, and securing said accessory to said mounting means.

40. The method as defined in claim 38, further including the step of connecting said conductors to said vehicle electrical system.

41. A method of providing a vehicle panel including electrical accessories comprising the steps of:

forming a vehicle panel including at least three electrical conductors therein;

assembling a plurality of layers in said panel, wherein more than one of said layers are electrically conductive;

forming at least one aperture in said vehicle panel to expose said conductors in said panel, said at least one aperture adapted to receive a vehicle accessory; and mounting said vehicle accessory in said aperture in said panel such that said vehicle accessory connects to said at least one of said conductors.

42. A method of providing a vehicle panel including electrical accessories comprising the steps of:

forming a vehicle panel including at least three electrical conductors therein;

assembling a plurality of conductive strips extending through said panel between a layer of said panel;

forming at least one aperture in said vehicle panel to expose said conductors in said panel, said at least one aperture adapted to receive a vehicle accessory; and mounting said vehicle accessory in said aperture in said panel such that said vehicle accessory connects to said at least one of said conductors.

43. A decorative vehicle trim panel assembly, comprising:

a panel adapted to be mounted to a vehicle;

at least one panel conductor carried on said panel, said at least one panel conductor adapted to be connected to the vehicle's electrical system; and an electrical accessory adapted to be carried on said panel, said electrical accessory including at least one accessory conductor and at least one insulation displacement contact fixedly secured to a surface of said electrical accessory and coupled to an end of said accessory conductor to secure said end of said accessory conductor to said surface, said at least one insulation displacement contact being connected to said at least one panel conductor.

44. The decorative vehicle trim panel assembly as defined in claim 43, wherein said accessory is a vehicle visor assembly.

45. The decorative vehicle trim panel assembly as defined in claim 43, wherein said electrical accessory includes a lamp receptacle, said lamp receptacle including at least one contact coupled to said at least one accessory conductor.

46. The decorative vehicle trim panel assembly as defined in claim 43, wherein said at least one panel conductor includes a plurality of panel conductors providing a multi-conductor electrical bus for said panel.

47. The decorative vehicle trim panel assembly as defined in claim 46, wherein said plurality of conductors are provided in a ribbon cable.

48. The decorative vehicle trim panel assembly as defined in claim 46, wherein said electrical accessory is a lamp assembly.

49. The decorative vehicle trim panel assembly as defined in claim 46, wherein said electrical accessory is in an overhead console.

50. The decorative vehicle trim panel assembly as defined in claim 43, wherein said panel is a vehicle headliner.

51. The decorative vehicle trim panel assembly as defined in claim 43 and further including at least one panel conductor connected to the vehicle electrical system and at least one electrical system connector adapted to be connected to said at least one panel conductor, said electrical system connector including a first insulation displacement contact adapted to connect to said at least one panel conductor whereby said electrical system connector insulation displacement contact is connected to said at least one panel conductor to connect said at least one panel conductor to the vehicle electrical system.

52. The decorative vehicle trim panel assembly as defined in claim 43, wherein said vehicle accessory is a center high-mounted stop-lamp including at least one lamp, said at least one stop lamp including at least one insulation displacement contact.

53. A decorative vehicle trim panel assembly, comprising:

a panel adapted to be mounted to a vehicle;

at least one panel conductor carried on said panel, said at least one panel conductor adapted to be connected to the vehicle's electrical system; and an electrical accessory adapted to be carried on said panel, said electrical accessory including at least one accessory conductor and at least one insulation displacement contact fixedly secured to a surface of said electrical accessory and coupled to said accessory conductor, said at least one insulation displacement contact being connected to said at least one panel conductor, wherein said panel has at least one aperture formed therein, said at least one panel conductor is fixed to said panel across said at least one aperture, and said at least one insulation displacement contact being connected to said at least one panel conductor through said at least one aperture.

54. A decorative vehicle trim panel assembly, comprising:

a panel adapted to be mounted to a vehicle;

at least one panel conductor carried on said panel, said at least one panel conductor adapted to be connected to the vehicle's electrical system; and a vehicle visor assembly adapted to be carried on said panel, said vehicle visor assembly including at least one accessory conductor, and at least one insulation displacement contact fixedly secured to a surface of said vehicle visor assembly and coupled to an end of said accessory conductor to secure said end of said accessory conductor to said surface, said at least one insulation displacement contact being connected to said at least one panel conductor.

55. The decorative vehicle trim panel assembly as defined in claim 54, wherein said panel is a vehicle headliner.

56. The decorative vehicle trim panel assembly as defined in claim 55, wherein said visor assembly includes a bracket including means for supporting a visor pivot rod on said bracket, and said bracket including means for connecting at least one visor electrical conductor connected to a vanity mirror lamp to at least one panel electrical conductor on said vehicle headliner.

57. The decorative vehicle trim panel assembly as defined in claim 55, further including a mounting cap and means for assembling said bracket to said mounting cap such that the vehicle headliner is positioned between said bracket and said mounting cap.

58. The decorative vehicle trim panel assembly as defined in claim 57, wherein said mounting cap includes means for securing the conductor in said connector when said bracket is assembled to said mounting cap.

59. A decorative vehicle trim panel assembly comprising:

a vehicle headliner adapted to be mounted to a vehicle;

at least one panel conductor carried on said vehicle headliner, said at least one panel conductor adapted to be connected to the vehicle's electrical system; and a vehicle visor assembly adapted to be carried on said vehicle headliner, said vehicle visor assembly including at least one accessory conductor and at least one insulation displacement contact fixedly secured to a surface of said vehicle visor assembly and coupled to said accessory conductor, said at least one insulation displacement contact being connected to said at least one panel conductor, wherein said visor assembly includes:

a bracket including means for supporting a visor pivot rod on said bracket, and said bracket including means for connecting at least one visor electrical conductor connected to a vanity mirror lamp to at least one panel electrical conductor on said vehicle headliner, wherein said at least one insulation displacement contact is fixedly secured to a surface of said bracket, and a mounting cap and means for assembling said bracket to said mounting cap such that the vehicle headliner is positioned between said bracket and said mounting cap, wherein said mounting cap includes means for securing the conductor in said connector when said bracket is assembled to said mounting cap.

60. A vehicle panel assembly comprising:

a panel including a first outer layer, a second outer layer, and at least two electrically conductive layers between said outer layers;

a first electrical accessory adapted to be assembled to said panel, said first electrical accessory including at least one electrical conductor adapted to be connected to a first one of said conductive layers, whereby said first electrical accessory is connected to said first one of said conductive layers at any location on said panel by cutting an aperture in said panel to access said electrical conductive layers; and a second electrical accessory adapted to be assembled to said panel, said second electrical accessory including at least one electrical conductor adapted to be connected to a second one of said conductive layers, whereby said second electrical accessory is connected to said second one of said conductive layers at any location on said panel by cutting an aperture in said panel to access said electrical conductive layers, wherein said first one of said electrically conductive layers selectively provides power to said first electrical accessory, and said second electrically conductive layer selectively provides power to said second electrical accessory.

61. The vehicle panel assembly as defined in claim 60, wherein said electrically conductive layers of said panel are separated by dielectric layers.

62. The vehicle panel assembly as defined in claim 61, wherein said at least two electrically conductive layers further include a third electrically conductive layer.

63. The vehicle panel assembly as defined in claim 62, wherein said third electrically conductive layer is connected to, and provides an electrical ground to, said first and second vehicle accessories.

64. A method of providing a vehicle panel including electrical accessories comprising the steps of:

forming a vehicle panel including at least two electrical conductors therein, said at least two electrical conductors including a first electrical conductor for selectively providing power to a first vehicle accessory and a second electrical conductor for selectively providing power to a second vehicle accessory independently from the power selectively provided by said first electrical conductor to said first vehicle accessory;

forming a first aperture in said vehicle panel to expose said first electrical conductor in said vehicle panel, said first aperture adapted to receive said first vehicle accessory;

mounting said first vehicle accessory in said first aperture in said vehicle panel such that said first vehicle accessory connects to said exposed first electrical conductor;

forming a second aperture in said vehicle panel to expose said second electrical conductor in said vehicle panel, said second aperture adapted to receive said second vehicle accessory; and mounting said second vehicle accessory in said second aperture in said vehicle panel such that said second vehicle accessory connects to said exposed second electrical conductor.

* * * * *